United States Patent
DeCarlo et al.

(10) Patent No.: US 7,171,302 B2
(45) Date of Patent: Jan. 30, 2007

(54) DETERMINING ENGINE CYLINDER CONTRIBUTION FROM INDEXED ENGINE DATA

(75) Inventors: Robert D. DeCarlo, Palatine, IL (US); Michael B. Meeker, Palatine, IL (US); Dennis M. Mutzabaugh, Mt. Prospect, IL (US); Ronald M. J. Lammers, Hilversum (NL); Nicolaas M. J. Stoffels, Haarlem (NL)

(73) Assignee: Snap-On Incorporated, Pleasant Prairie, WI (US)

( * ) Notice: Subject to any disclaimer, the term of this patent is extended or adjusted under 35 U.S.C. 154(b) by 85 days.

(21) Appl. No.: 10/840,434

(22) Filed: May 7, 2004

(65) Prior Publication Data

US 2005/0251321 A1  Nov. 10, 2005

(51) Int. Cl.
 *G01M 15/04* (2006.01)
(52) U.S. Cl. ..................................................... 701/114
(58) Field of Classification Search ................. 701/100, 701/101, 109, 114, 115; 324/378, 379, 380, 324/382, 392
See application file for complete search history.

(56) References Cited

U.S. PATENT DOCUMENTS

| | | | |
|---|---|---|---|
| 3,503,256 A | 3/1970 | List et al. | |
| 3,771,047 A | 11/1973 | Spengler et al. | |
| 3,982,193 A | 9/1976 | Maringer | |
| 4,285,241 A * | 8/1981 | Smith et al. | 73/572 |
| 4,379,900 A | 4/1983 | Sulzbach et al. | |
| 4,459,548 A | 7/1984 | Lentz et al. | |
| 4,787,053 A * | 11/1988 | Moore | 701/123 |
| 4,812,979 A | 3/1989 | Hermann et al. | |
| 5,004,979 A | 4/1991 | Marino et al. | |
| 5,087,881 A | 2/1992 | Peacock | |
| 5,241,480 A | 8/1993 | Takaku et al. | |
| 5,524,480 A | 6/1996 | Schlienz et al. | |
| 5,663,493 A | 9/1997 | Gerbert et al. | |
| 5,687,082 A * | 11/1997 | Rizzoni | 701/111 |
| 5,726,891 A * | 3/1998 | Sisson et al. | 701/100 |
| 5,978,727 A * | 11/1999 | Jones et al. | 701/101 |
| 7,007,211 B1 * | 2/2006 | White et al. | 714/718 |

FOREIGN PATENT DOCUMENTS

| | | |
|---|---|---|
| EP | 0 408 877 B1 | 1/1991 |
| EP | 0 494 171 B1 | 7/1992 |
| WO | WO 03/107020 A2 | 12/2003 |

OTHER PUBLICATIONS

Jaworski, B.M., et al. "Physik Griffbereit." Sep. 1974, XP002339713, pp. 443-445.

* cited by examiner

*Primary Examiner*—Andrew M. Dolinar
*Assistant Examiner*—Johnny H. Hoang
(74) *Attorney, Agent, or Firm*—McDermott Will & Emery LLP

(57) ABSTRACT

An engine diagnostic system is provided that enables a service technician to evaluate engine cylinder contribution to output power. The service technician couples one or more signal leads to the vehicle's battery, alternator, or accessory receptacle (e.g., cigarette lighter receptacle) to provide an alternator output signal to a signal analyzer. The signal analyzer processes the alternator output signal to generate an engine signature, which represents engine cylinder contribution to engine output power.

33 Claims, 21 Drawing Sheets

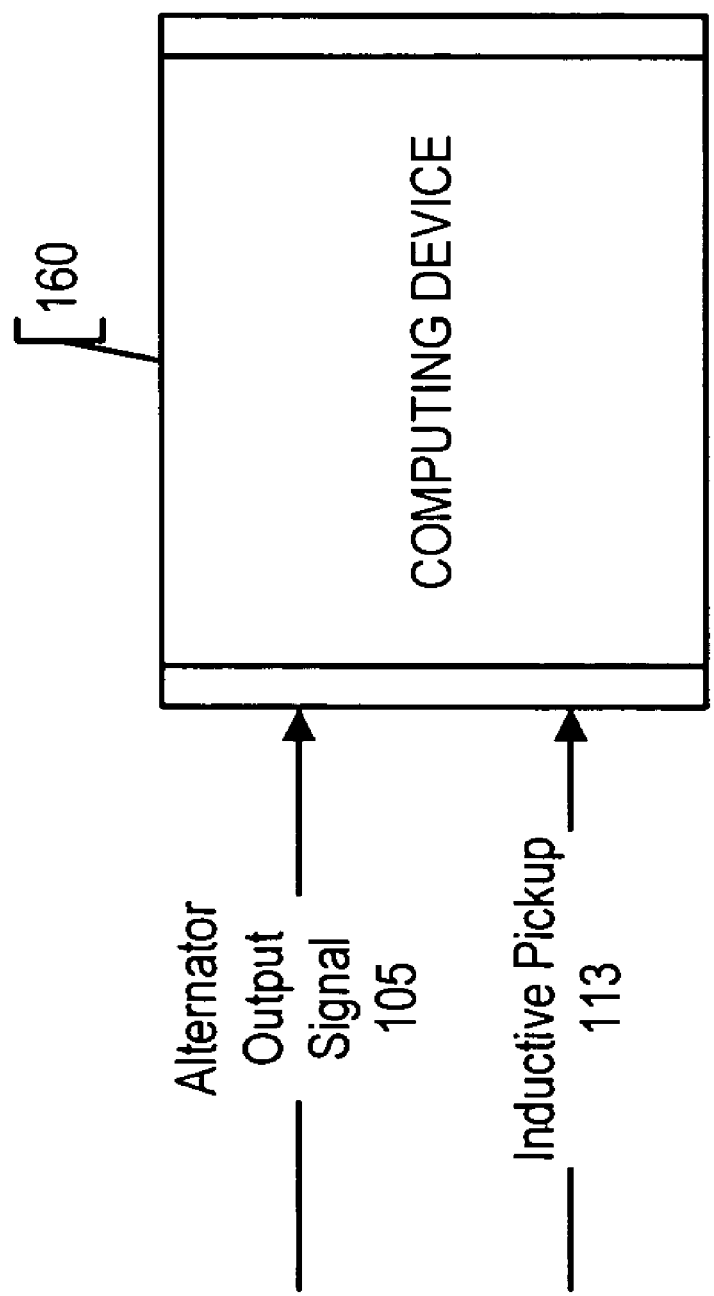

FIG. 4    FRONT END 305

RAW INDEXED ENGINE DATA

SYNCHRONIZED ENGINE SIGNATURE

DETERMINING ENGINE CYLINDER CONTRIBUTION FROM INDEXED ENGINE DATA

RELATED APPLICATION

This application is related to the U.S. patent application of DeCarlo et al., entitled "Decoding an Alternator Output Signal," filed on even date herewith.

TECHNICAL FIELD

The present disclosure relates generally to engine diagnostics, and more particularly, to evaluating engine cylinder contribution to output power by analyzing the diode ripple signal from an alternator driven by the engine.

BACKGROUND

One type of engine performance problem found in internal combustion engines is poor cylinder contribution. In a properly functioning engine, each cylinder contributes equally to the total output power for balanced operation. One problem with conventional diagnostic instruments that measure cylinder contribution is that they often require complicated or time-consuming connections to the engine. Further, conventional diagnostic instruments may display results that are difficult to interpret or provide only general information. That is, a technician may invest time setting up a diagnostic instrument yet not receive specific enough information about a problem or performance issue to perform a repair efficiently.

Another conventional technique for measuring engine cylinder contribution derives information about cylinder contributions from the alternator output signal. This technique typically involves a simple electrical connection at the alternator, battery, or electrical accessory receptacle (e.g., a cigarette lighter receptacle). In a typical engine system, a crank pulley on the engine drives an associated alternator pulley using a belt. The alternator pulley is coupled to the alternator rotor, which rotates to generate electrical energy. A typical alternator internally generates a multiphase (e.g., 3 phase) alternating current (AC) signal. This multiphase signal is rectified by a number of diodes, such that the alternator outputs a mostly direct current (DC) signal. The alternator output signal also includes, however, a small AC component known as the ripple voltage or diode ripple signal.

Engine speed varies slightly as each cylinder fires. More specifically, the engine accelerates immediately after a cylinder firing and then decelerates until another cylinder firing occurs. Cylinder contribution can be assessed therefore by analyzing the instantaneous variations in engine speed. The diode ripple signal is proportional to the instantaneous speed of the engine because the alternator is coupled to the engine's crankshaft. That is, variations in the engine speed modulate the diode ripple signal in a mathematically meaningful manner.

In some prior approaches, the diode ripple signal is demodulated using a frequency modulation (FM) receiver or analog phase locked loop. One problem with these approaches, however, is the accuracy or precision of the resulting demodulated signal. The diode ripple signal is typically corrupted by electrical noise or other signals that emanate from various sources. For example, the alternator itself may produce undesirable transients and amplitude modulations in the diode ripple signal. These noise signals can make it difficult to demodulate the diode ripple signal accurately or precisely. Given that an engine performance problem is likely attributable to the malfunction of a single engine cylinder, a technician does not want to receive inaccurate information and, therefore, consume diagnostic or repair time on a properly functioning cylinder.

What is needed is a system and method for demodulating the diode ripple signal that is robust in the presence of amplitude variations and impulse impairments. What is further needed is a system and method that filters the alternator output signal to reduce interference.

SUMMARY OF THE DISCLOSURE

In one aspect, a signal processing system generates an engine signature from indexed engine data. The engine signature represents the contribution to output power provided by the firing of each cylinder. The engine signature may be displayed in various ways. For example, the engine signature may be displayed as a waveform, as numerical data, or as a comparative percentage of contribution for each cylinder. The signal processing system includes a buffering unit, an engine data repair unit, a synchronization unit, a signature filter, and an integrator. The buffering unit receives the indexed engine data from the front end or from a storage device. The engine data repair unit reconstructs discontinuity errors in the engine data and provides the engine data to the synchronization unit, which filters and resamples the engine data. The signature filter and the integrator further filter the engine cycle data for display.

In another aspect, a method for generating an engine signature from indexed engine data includes receiving the indexed engine data, generating reconstructed engine data, producing an engine cycles signal, and filtering the engine cycles signal to produce the engine signature. The method further includes receiving a data tag in a tag collection unit and providing an external trigger tag to a synchronization unit and an error tag to an engine data repair unit.

In a further aspect, a method for processing indexed engine data includes calculating a number of indexed engine samples per engine cycle and constructing an engine cycles signal using the number of indexed engine sample per engine cycle. An internally generated phase control bias signal or an external trigger signal be used to control the starting position of the engine cycles signal.

In another aspect, a method for repairing engine data includes receiving indexed engine data and at least one error tag and creating an interpolation of the indexed engine data based on the at least one error tag. The interpolation uses the at least one error tag to connect a last good data point with a next good data point.

Additional aspects and advantages of the present disclosure will become readily apparent to those skilled in this art from the following detailed description, wherein only exemplary embodiments are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The accompanying drawings illustrate several embodiments and, together with the description, serve to explain the principles of the present disclosure.

FIGS. 1A and 1B are a block diagrams illustrating system overviews according to an embodiment of the present disclosure.

DETAILED DESCRIPTION OF THE EMBODIMENTS

The present disclosure is now described more fully with reference to the accompanying figures, in which several embodiments are shown. The embodiments described herein may include or be utilized with any appropriate engine having an appropriate voltage source, such as a battery, an alternator and the like, providing any appropriate voltage, such as about 6 Volts, 12 Volts, 24 Volts, 42 Volts and the like. As one skilled in the art will appreciate from the following detailed description, the embodiments described herein may operate independent of a particular direct current (DC) voltage. The embodiments described herein may be used with any desired system or engine. Those systems or engines may comprise items utilizing fossil fuels, such as gasoline, diesel, natural gas, propane and the like, electricity, such as that generated by battery, magneto, solar cell and the like, wind and hybrids or combinations thereof. Those systems or engines may be incorporated into other systems, such as an automobile, a truck, a boat or ship, a motorcycle, a generator, an airplane and the like.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

One skilled in the art will further recognize that arrangement of the features or functions of the present disclosure into particular functional blocks of the block diagrams illustrated in FIGS. 1–10 represent one example of how the features or functions of the present disclosure can be implemented. For instance, FIG. 11 represents another embodiment or implementation of the front end illustrated in FIG. 3. Particular ones of the functional blocks may include more, less, or different functionality as desired.

A. System Overview

In an embodiment of the present disclosure, an engine diagnostic system is provided that enables a service technician to evaluate engine cylinder contribution to output power quickly, accurately, and precisely. In a typical application of the present disclosure, the service technician couples one or more signal leads to the vehicle's battery, alternator, or accessory receptacle (e.g., cigarette lighter receptacle). These signal leads provide an electrical signal including a diode ripple signal, which the disclosed systems and methods analyze in order to display engine cylinder contribution information for the service technician's review. As one skilled in the art will appreciate, an advantage of the present disclosure is that accurate and precise information about engine performance can be obtained using an uncomplicated electrical connection to the engine under test.

Figure 1A:
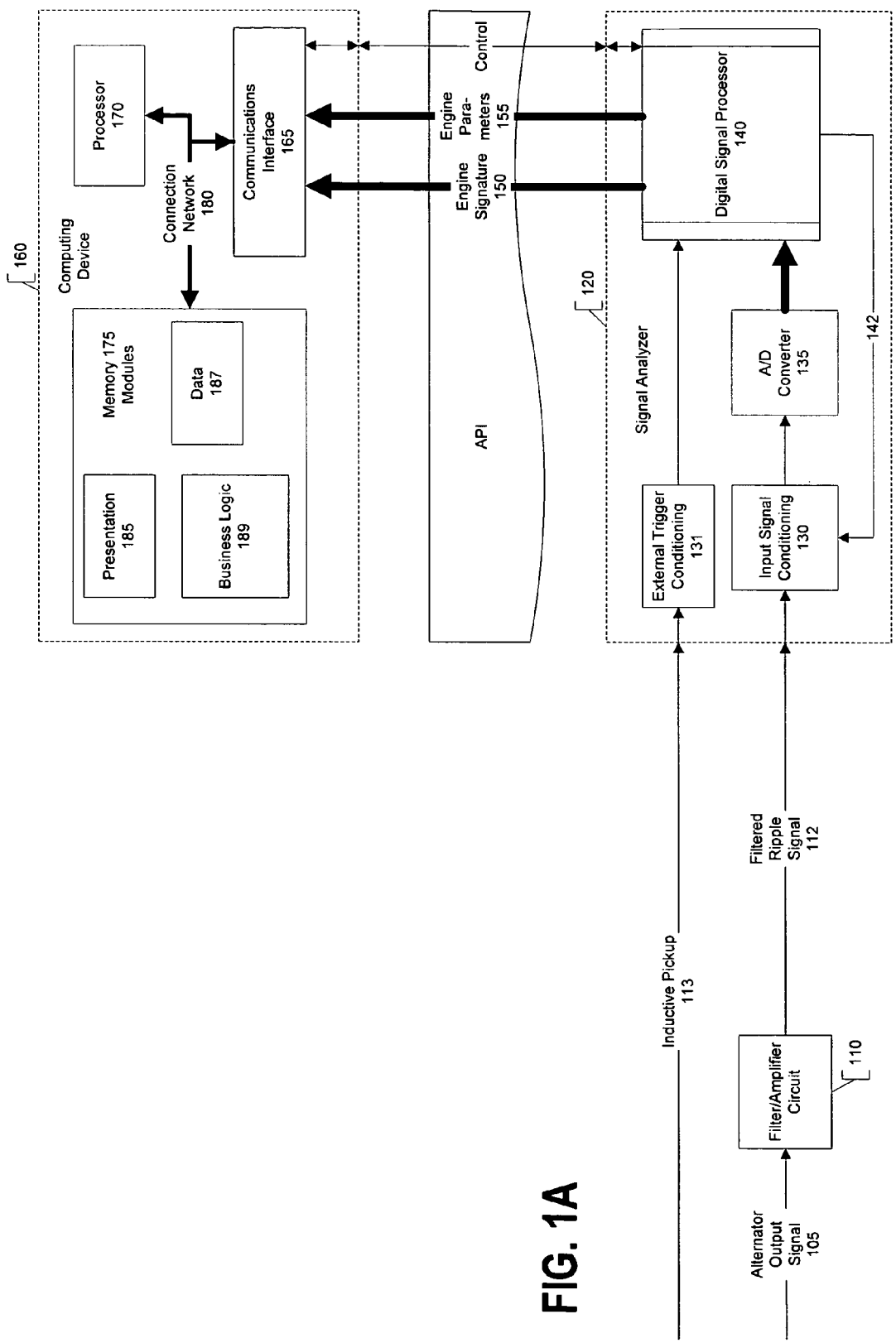

FIG. 1A is a block diagram illustrating a system overview according to an embodiment of the present disclosure. The illustrated system includes a filter/amplifier circuit 110, a signal analyzer 120, and a computing device 160. An alternator output signal 105 is provided as an input signal to the signal analyzer 120. In a typical embodiment, the alternator output signal 105 includes two signal paths or conductors (i.e., positive and negative) from the vehicle's battery. Of course, the alternator output signal 105 can be obtained from other sources, such as an accessory receptacle or between the vehicle's negative terminal and alternator ground case.

The alternator output signal 105 is provided to the filter/amplifier circuit 110. The filter/amplifier circuit 110 applies a bandpass filter to the alternator output signal 105 to reduce unwanted interference while preserving the diode ripple signal. The filter/amplifier circuit 110 also amplifies the passband with an AC gain of about 10. In an exemplary application, the diode ripple signal has a nominal frequency of about 1 kHz.

The filter/amplifier circuit 110 generates a filtered ripple signal 112 that is provided as an input to the signal analyzer 120. The signal analyzer 120 decodes the filtered ripple signal 112 to generate an engine signature for an engine cycle (i.e., a single firing of each cylinder in the firing order). The engine signature represents the contribution to output power provided by the firing of each cylinder. The engine signature may be displayed in various ways. For example, the engine signature may be displayed as a waveform (see, e.g., FIG. 19), as numerical data, or as a comparative percentage of contribution for each cylinder.

1. Signal Analyzer 120

The signal analyzer 120 is a diagnostic instrument with suitable signal inputs or interfaces (such as a MODIS device with the lab scope accessory, which is commercially available from Snap-on Diagnostics, Inc. of San Jose, Calif.). The signal analyzer 120 includes input signal conditioning 130, external trigger conditioning 131, an analog-to-digital converter (ADC) 135, and a digital signal processor (DSP) 140. The input signal conditioning 130 receives the filtered ripple signal 112 and adjusts the peak-to-peak amplitude of the filtered ripple signal 112 for processing by the ADC 135 and the DSP 140. The ADC 135 samples the output of the input signal conditioning 130 and provides a digital bitstream output to the DSP 140. The DSP 140 controls the amplitude of the digital bitstream via a control signal 142, which is coupled to the input signal conditioning 130. An external or inductive pickup 113 can also be used as an external signal for synchronization. This signal is processed by the external signal conditioning block 131 and sent to the DSP 140.

In the illustrated embodiment, the ADC 135 is a conventional ADC that samples the input signal at 1.5 MHz with a 12-bit resolution. The DSP 140 can be a conventional DSP (such as DSP 5409A, which is commercially available from Texas Instruments Inc. of Dallas, Tex.). The DSP 140 may also include internal and/or external storage memory (not illustrated). The DSP 5409A includes 32 Kbytes of internal storage and 512 Kbytes of external storage. Example uses for these storage memories include storing the processed data and recording data signals for offline analysis.

The DSP 140 provides an output signal 150 that includes the engine signature. The signal analyzer 120 includes two operating modes: real-time analysis and off-line analysis. More specifically, the signal analyzer 120 may perform the acquisition and processing of the filtered ripple signal 112 and generate an output signal (e.g., an engine signature) in real-time. The signal analyzer 120 may also be configured to acquire and to process the filtered ripple signal 112 into indexed engine data that can be conveniently stored for offline analysis. The functionality of the signal analyzer 120 is described in further detail below and with reference to FIG. 3.

2. Computing Device 160

The computing device 160 can be used, for example, to display the diagnostic data or results. The computing device includes a communications interface 165, a processor 170, memory modules 175, and a connection network 180. The connection network 180 operatively couples each of the communications interface 165, the processor 170, and the memory modules 175. The memory modules 175 include a data memory 187, a presentation unit 185, and business logic unit 189. The connection network 180 can be an electrical bus, switch fabric, optical interconnect, or other suitable interconnection system.

The computing device 160 interfaces with the signal analyzer 120 via an application programming interface (API). The API allows the computing device 160 (or other host) to collect data from the signal analyzer 120 and to provide data, such as control information, to the signal analyzer 120. The API operates in conjunction with the presentation unit 185 to retrieve the output data from the DSP 140 and to display the data or results. The API also provides a programming interface for the computing device 160 to interact with the signal analyzer 120. Accordingly, the API module sends information (e.g., user input and configuration parameters) to the signal analyzer 120 and receives messages from the signal analyzer 120. More specifically, messages from the signal analyzer 120 can include data related to the engine signature 150 and engine parameters 155 generated by the DSP 140, as well as operating instructions or other textual information. As one skilled in the art will appreciate, the API software functions can be implemented in various programming languages or scripts to interface with the signal analyzer 120. That is, the API can provide a high-level interface for programmatically interacting with the signal analyzer 120 and the functionality provided therein. Table 1 includes a description of exemplary API functions that may be used to interface with the signal analyzer 120.

TABLE 1

| Function | Example Parameters |
| --- | --- |
| Start - Start processing | Front end acquisition mode setting |
| Stop - Stop processing | Power toggle |
| Get - Get engine signature data | Engine cycle identifier, Channel |
| Operation - Setup operational characteristics | Set/Acquire alternator ratio, Lock ratio setting |
| Trigger - Setup trigger modes | Number of cylinders, Trigger mode, Ignition type, Phase adjustment |
| Display - Setup display controls | Display integration value |
| ESFilter - Control engine signature filtering | Low frequency cutoff, High frequency cutoff |

The processor 170 is a conventional microprocessor. In one embodiment, the computing device 160 is portable and powered by a battery. In this instance, the processor 170 may be designed for low power operation in order to provide satisfactory runtime before requiring recharging or replacement of the battery. In a typical service facility, satisfactory runtime is approximately 8 hours or the duration of a technician's shift.

The processor 170 executes instructions or program code modules from the memory modules 175. The operation of the computing device 160 is programmable and configured by the program code modules. Such instructions may be read into the memory modules 175 from another computer readable medium. Execution of the sequences of instructions contained in the memory modules 175 causes the processor 170 to perform the method or functions described herein. In alternative embodiments, hardwired circuitry may be used in place of or in combination with software instructions to implement aspects of the disclosure. Thus, embodiments of the disclosure are not limited to any specific combination of hardware circuitry and software. The memory modules 175 can be represented, for example, by one or more random access memory (RAM) devices, flash RAM, or electronically erasable programmable read only memory (EEPROM) devices.

The data memory 187 provides data storage capability for program code that the executed by the processor 170. The business logic unit 189 includes program code for implementing the functionality of the application. More specifically, the business logic unit 189 interacts with the API to gather data from the signal analyzer and to provide control information to the signal analyzer. The business logic unit 189 also coordinates with the presentation unit 185 to generate screen displays or receive user input.

The presentation unit 185 includes display elements that can be presented on a display screen (not illustrated). The presentation unit 185 can generate user interface displays including waveform data, test results, and the like. An example engine signature that may be displayed by the presentation unit 185 is described below and with reference to FIG. 19.

The term "computer readable medium" as used herein refers to any medium that participates in providing instructions to the processor 170 for execution. Such a medium may take many forms, including but not limited to, non-volatile media, volatile media, and transmission media. Non-volatile media includes, for example, optical or magnetic disks. Volatile media includes dynamic memory, such as the memory 175. Transmission media includes coaxial cables, copper wire and fiber optics, including the wires or communication paths that comprise the connection network 180. Transmission media can also take the form of acoustic or light waves, such as those generated during radio wave and infrared data communications.

Common forms of computer readable media include, for example, a floppy disk, a flexible disk, hard disk, magnetic tape, or any other magnetic medium, a CD-ROM, any other optical medium, punch cards, paper tape, any other physical medium with patterns of holes, a RAM, a programmable ROM (PROM), an electrically PROM (EPROM), a flash EPROM, any other memory chip or cartridge, a carrier wave, or any other medium from which a data processing system can read.

Various forms of computer readable media may be involved in carrying one or more sequences of one or more instructions to the processor 170 for execution. For example, the instructions may initially be carried on a magnetic disk of a remote data processing system, such as a server. The remote data processing system can load the instructions into its dynamic memory and send the instructions over a communications link. The communications interface 165 can receive the data from the communications link and place the data on the connection network 180. The connection network 180 can then carry the data to the processor 170 for execution.

The communications interface 165 provides bidirectional data communication coupling for the computing device 160. In one embodiment, the communications interface 165 provides one or more input/output ports for receiving electrical, radio frequency, or optical signals and converts signals received on the port(s) to a format suitable for transmission on the connection network 180. For example, the communications interface 165 may include one or more analog-to-digital (A/D) converters or other logic for sampling input signals, such as the alternator output signal 105.

Referring now to FIG. 1B, there is shown a system overview block diagram according to another embodiment of the present disclosure. The computing device 160 implements data processing that is functionally similar to the signal analyzer 120. The computing device 160 receives the alternator output signal 105 and the inductive pickup signal 113 via the communications interface 165. As described above, the communications interface 165 can provide the ADC capabilities and carry the digital data to the processor 170 via the connection network 180.

As one skilled in the art will appreciate, the filtering functions provided by the filter/amplifier circuit 110 may also be performing in the digital signal domain. The use of the filter/amplifier circuit 110 depends on the sampling capabilities of the ADC circuits and/or signal processing capabilities of the host system. Thus, for clarity of the generalized or high-level system overview illustrated in FIG. 1B, the functionality of the filter/amplifier circuit 110 is integrated into the signal processing performed in the computing device 160.

Figure 3:
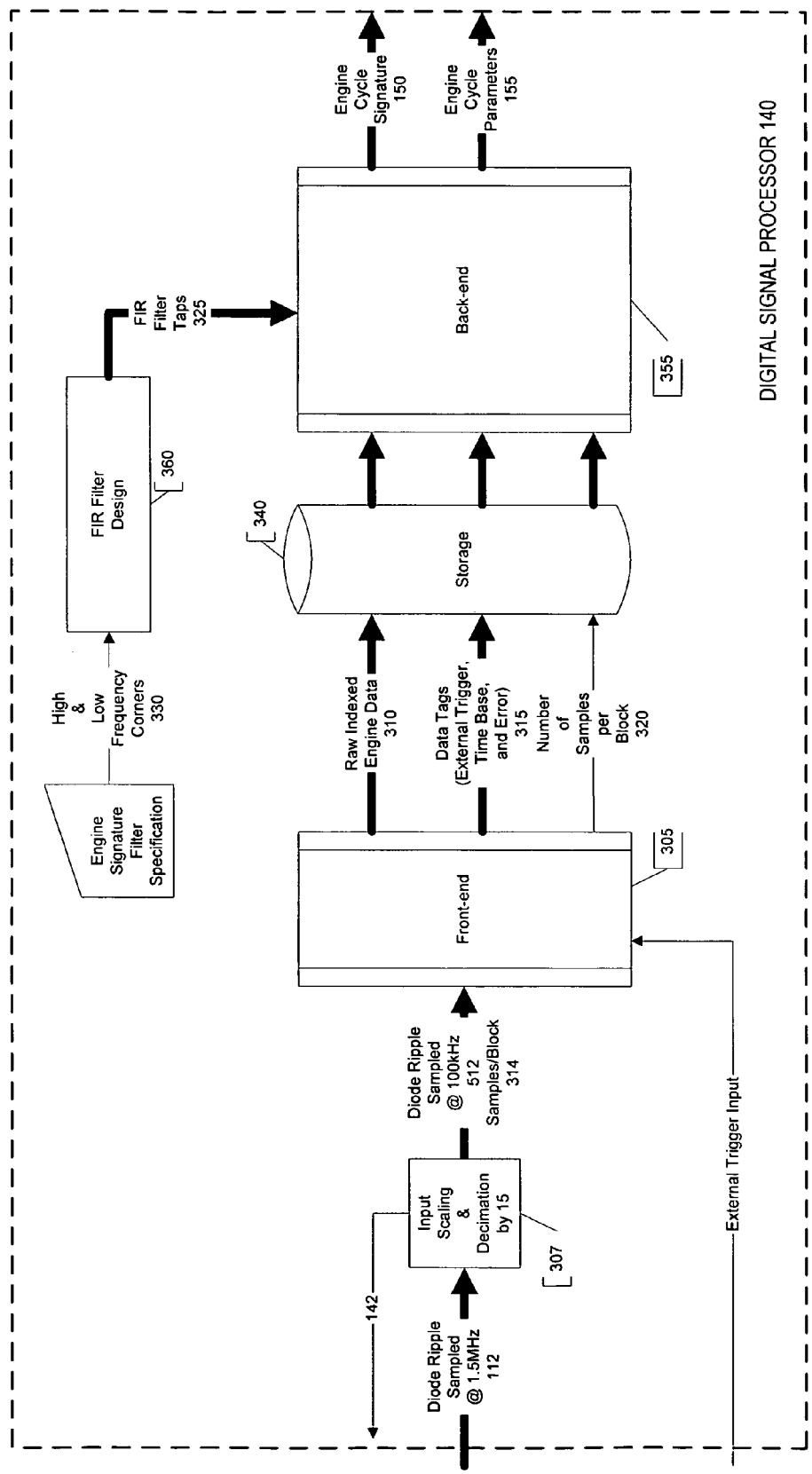
FIG. 3 is a block diagram of the digital signal processor illustrated in FIG. 1A according to an embodiment of the present disclosure.

The computing device 160 receives and processes the alternator output signal 105 in a similar manner to the DSP-related processing described herein and with more specific reference to FIG. 3. The processor 170 can execute program code to generate an engine signature or other engine cylinder contribution data.

B. Filter/Amplifier Circuit 110

Figure 2B:
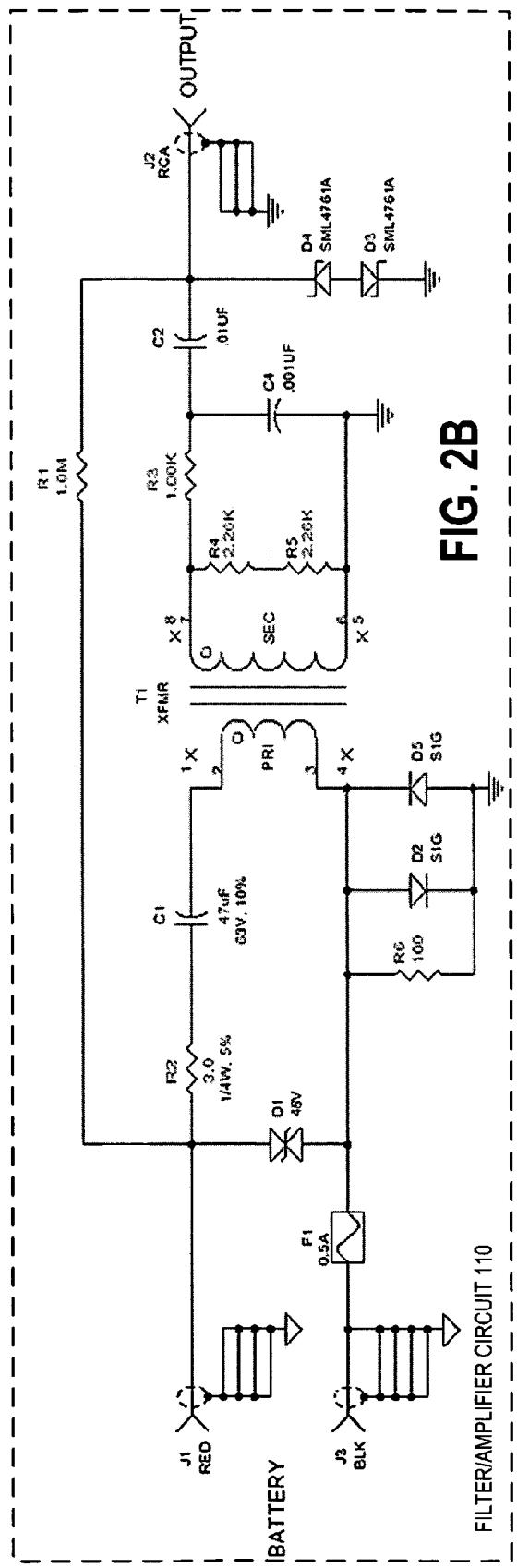
FIG. 2B is a schematic of the filter/amplifier circuit illustrated in FIG. 2A according to an embodiment of the present disclosure.
Figure 2A:
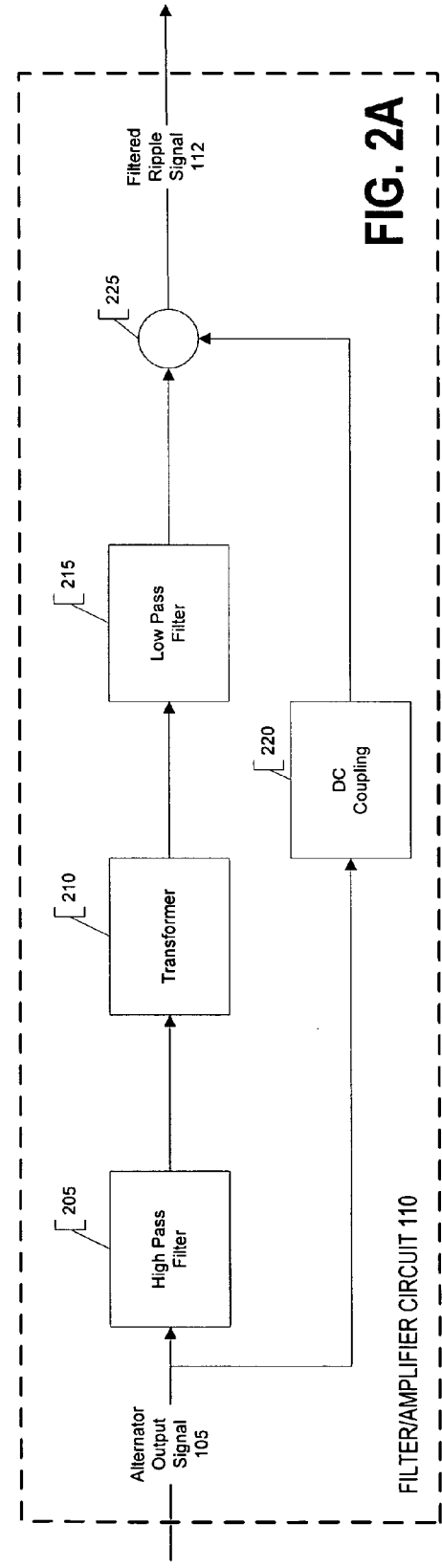
FIG. 2A is a block diagram of a filter/amplifier circuit according to an embodiment of the present disclosure.

FIG. 2A is a block diagram of a filter/amplifier circuit according to an embodiment of the present disclosure. The illustrated embodiment includes a high pass filter 205, a transformer 210, a low pass filter 215, a DC coupler 220, and an adder 225. The high pass filter 205 and the low pass filter 215 taken together implement a bandpass filter for passing the diode ripple signal and attenuating other signals to reduce interference.

In operation, the alternator output signal is provided as an input to the high pass filter 205. The transformer 210 amplifies the resulting signal. In the illustrated embodiment, the transformer 210 is an audio band transformer with a gain of about 10. An audio band transformer is suitable for this embodiment because of its low cost and passband frequency range. Of course, other types of signal amplifiers and filter circuits (such as operational amplifier-based active circuits) may be used. As one skilled in the art will appreciate, an active filter/amplifier circuit may have improved linearity characteristics.

An amplified diode signal is desirable in order to provide a sufficient dynamic range in the AC small signal levels for proper processing. The range of the AC small signal varies from about 10 mV peak-to-peak to about 6 V peak-to-peak. The low pass filter 215 is employed to complete the bandpass filter. The bandpass frequency characteristic accepts the diode ripple signal that is expected from various common alternator systems. Typically, the first cutoff frequency is from about 155 Hz to 215 Hz and the second cutoff frequency is from about 27.5 KHz to 37.5 KHz. Of course, the filter/amplifier circuit may be modified or adjusted to work with rare or uncommon alternator systems.

The DC coupler 220 provides a DC signal path from the input to the output of the filter/amplifier circuit 110, although a DC signal path is not necessary for proper operation. In the illustrated embodiment, the DC coupler 220 is also configured to attenuate the alternator DC output signal to about 90 percent. The adder 225 then adds the attenuated alternator DC output signal to the amplified diode ripple signal to generate the filtered ripple signal 112.

The filter/amplifier circuit 110 is advantageously configured to apply an AC load on the input signal 105 (e.g., battery) in the passband. However, as one skilled in the art will appreciate, the alternator may need additional DC loading in order to generate a sufficient alternator output signal. Typically, a sufficient alternator output signal is one that includes nominal current for charging the battery or operating the electrical system of the vehicle. More specifically, without some DC loading the alternator may not be providing an output current that includes a diode ripple signal for which the signal analyzer 120 can process. A simple way of obtaining a sufficient DC loading can be activating the vehicle's headlights during the time period for which the signal analyzer 120 or the computing device 160 is acquiring data. Of course, other types of electrical loads can be directly or indirectly applied to the system (e.g., a carbon pile coupled to the battery). The filter/amplifier circuit 110 may also be modified to include a conventional DC loading component.

FIG. 2B is a schematic of the filter/amplifier circuit illustrated in FIG. 2A according to an embodiment of the present disclosure. FIG. 2B illustrates an example implementation of the filtering/amplifying functions described above with reference to FIG. 2A. The illustrated example includes passive components, such as a transformer, capacitors, resistors, fuses, and diodes. The resistor-capacitor networks are used to implement the bandpass filter. The transformer performs the signal amplification. The fuse F1 is used to protect the circuit and other coupled circuits during a fault condition (e.g., a short circuit on the output).

Table 2 illustrates exemplary values for the components illustrated in FIG. 2B.

TABLE 2

| Component Reference | Value |
| --- | --- |
| C1 | 47 μF |
| C2 | 0.01 μF |
| C4 | 0.001 μF |
| D1 | 48 V |
| D2 | S1 G |
| D3 | 75 V |
| D4 | 75 V |
| D5 | S1 G |
| F1 | 0.5 A |
| R1 | 1.0 MΩ |
| R2 | 3.0Ω ¼ W, 5% |
| R3 | 1.00 kΩ |
| R4 | 2.26 kΩ |
| R5 | 2.26 kΩ |
| R6 | 100 Ω |
| T1 | Audio band transformer (Gain ~ 10) |

C. Digital Signal Processor 140

FIG. 3 is a block diagram of the digital signal processor illustrated in FIG. 1A according to an embodiment of the present disclosure. The processing may be grouped into five stages: an input scaling and decimation by 15 block 307, a front end 305, a storage medium 340, a finite impulse response (FIR) filter design module 360, and a back end 355. The input scaling and decimation by 15 block 307 scales the diode ripple sampled data at 1.5 MHZ 112 and converts it to diode ripple sampled data at 100 KHz 314. The front end 305 performs data acquisition, signal conditioning, demodulation of the diode ripple signal, impulse removal, and processing this data into raw indexed engine data 310 and also provides data tags 315 and number of samples per block data 320 for back end processing 355 or for storage in the storage medium 340. The back end 355 processes the raw indexed engine data into the engine signature data. Although the back end 355 processing may directly follow from the front end 305 processing, the front and back ends 305, 355 can be independent processes. For example, the results of the front end 305 processing can be stored for subsequent or offline processing by the back end 355. A service technician or other user may also want to view the data generated by the front end 305 without performing the back end 355 processing. Additionally, the modularity of the front and back ends 305, 355 enables efficient non-real-time processing for highly impaired signals that are difficult to decode. More specifically, the front end 305 can be used to acquire and to store several seconds or minutes of the alternator output signal 105 for later processing.

The back end block 355 uses a FIR filter for processing the data for the display. These FIR filter taps 325 are generated by FIR filter design 360 using low frequency and high frequency responses 330 relative to the engine signature filter specification. Further details of the operation or functionality of the front and back ends 305, 355 are provided below and with reference to FIGS. 4–11.

1. Front End 305

Figure 4:
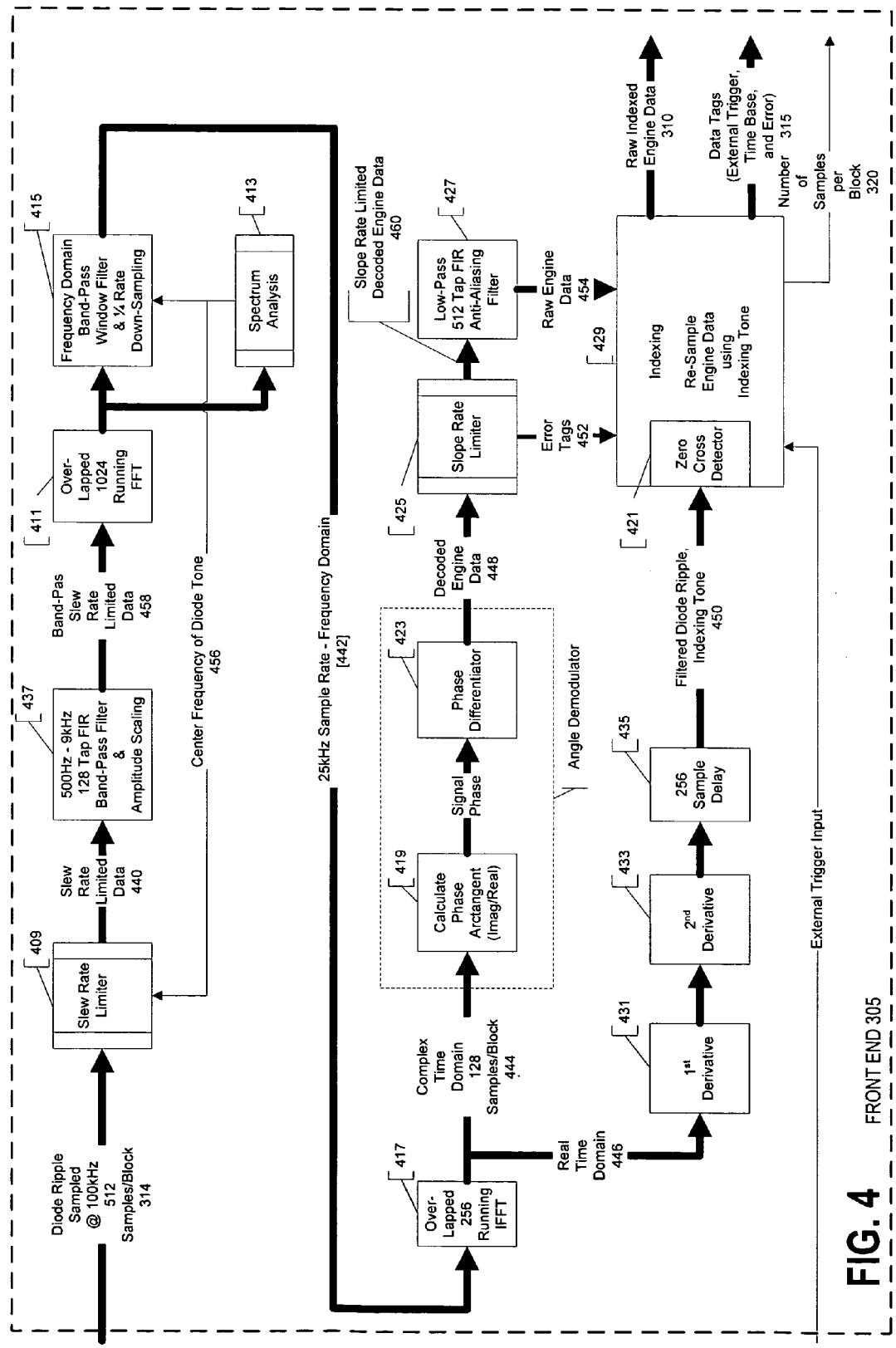
FIG. 4 is a block diagram of the front end illustrated in FIG. 3 according to an embodiment of the present disclosure.

FIG. 4 is a block diagram of the front end illustrated in FIG. 3 according to an embodiment of the present disclosure. The diode ripple sampled at 100 KHz data 314 is processed by a slew rate limiter 409. The slew rate limiter 409 examines the change of amplitude from data point n to data point n+1. If this change is larger then a predetermined threshold level, then the n+1 data point is limited to a fixed value from point n. This process produces slew rate limited data 440.

Figure 7:
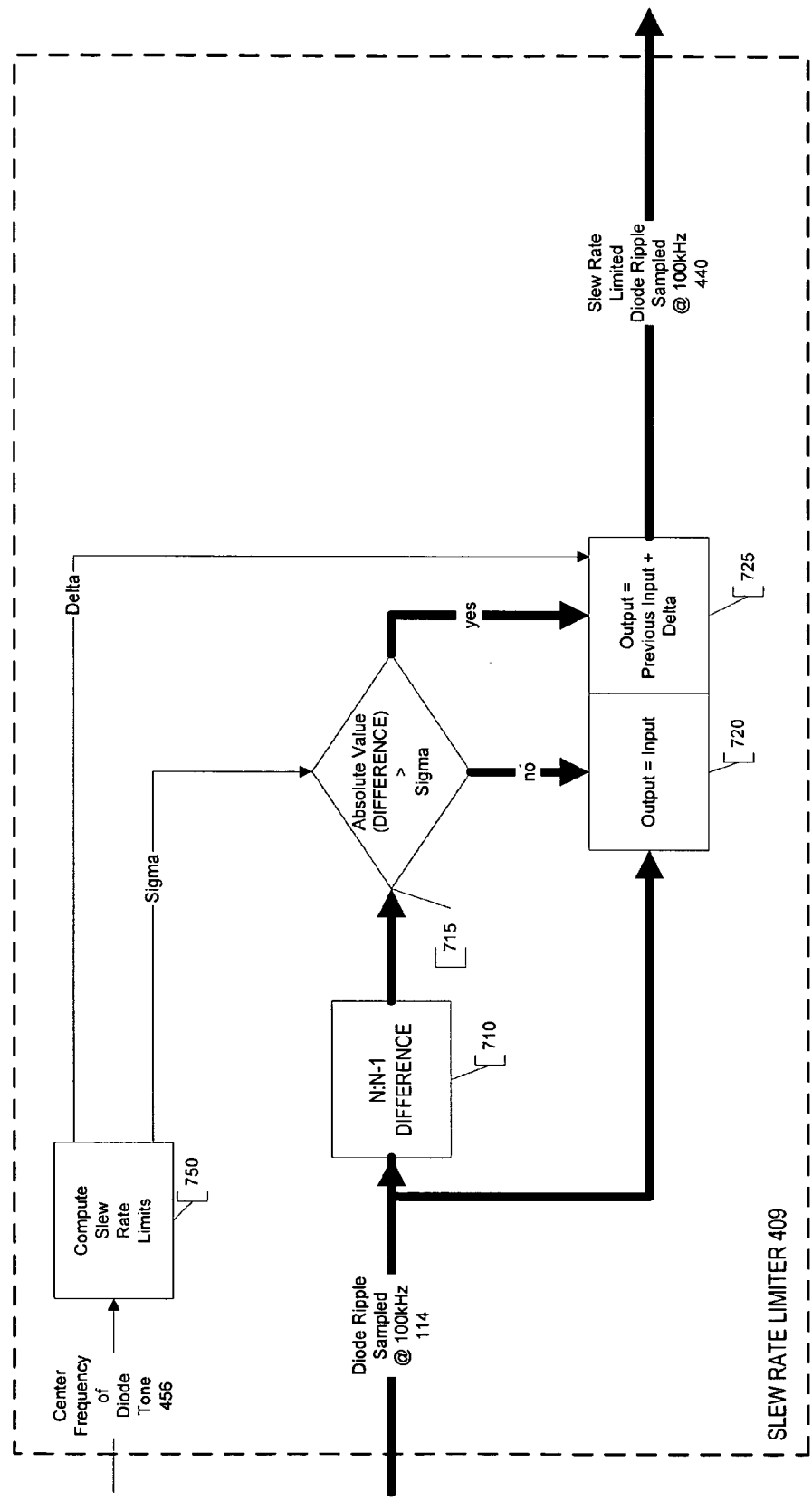
FIG. 7 is a block diagram of the slew rate limiter illustrated in FIG. 4 according to an embodiment of the present disclosure.
Figure 12:
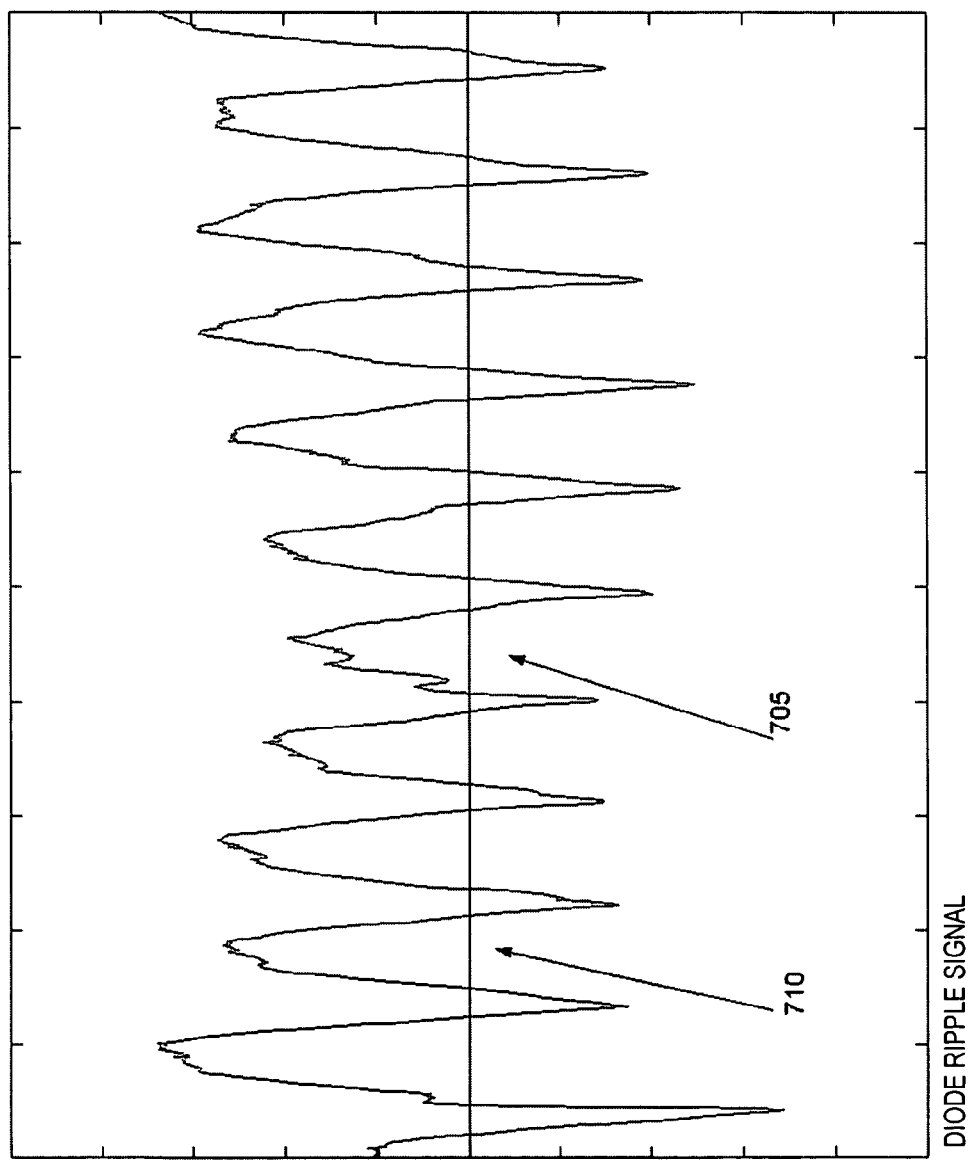
FIG. 12 is a waveform diagram illustrating a diode ripple signal according to an embodiment of the present disclosure.

Referring now to FIG. 7, there is shown a block diagram of the slew rate limiter 409. In the illustrated embodiment, a filtered ripple signal 112 is shown that corresponds to first and second engine speeds. As illustrated in FIG. 12, the first ripple signal 705 has a frequency of about 800 Hz. The second ripple signal 710 has a frequency of about 830 Hz, indicating a change in frequency.

Large impulses in the diode ripple data can cause ringing in the complex band pass filter 415. The slew rate limiter 409 is used to reduce these impulses while also controlling the rate of change of these large signals. A differencing block 710 receives the diode ripple sampled at 100 KHz 114. The differencing block 710 calculates the difference in amplitude from samples x(n−1) to x(n). The output of the differencing block is provided to decision tree 715. Block 715 determines whether this absolute value amplitude change is above a predetermined threshold or sigma. This threshold or sigma is computed by slew rate limits block 750 and it is based on the center frequency of diode tone 456 that was determined by the spectrum analysis routine 413. If the amplitude exceeds the sigma limit, then an impulse condition is set. A set impulse condition activates 725 which outputs the previous signal plus a delta which was also determined by slew rates limit block 750. If the difference signal is below the sigma value, then the output is equal to the input 720. The output signal in both conditions is the slew rate limited diode ripple sampled at 100 KHz.

Returning to FIG. 4, a 128-tap FIR band-pass filter and amplitude scaler 437 processes the slew rate limited data 440. This filter removes harmonics produced by the slew rate limiter and low frequency that were not removed by filter/amplifier circuit 110. This band-pass slew rate limited signal data 458 is sent to the overlapped 1024 running fast Fourier transform (FFT) 411.

The band-pass slew rate limited signal data 458 contains the angle modulated diode tone. An overlapped 1024 running FFT 411 can be used to transform the discrete samples of the band-pass slew rate limited signal data 458 from the time domain to the frequency domain. The frequency of the diode tone can be detected using a spectrum analysis 413.

Figure 9:
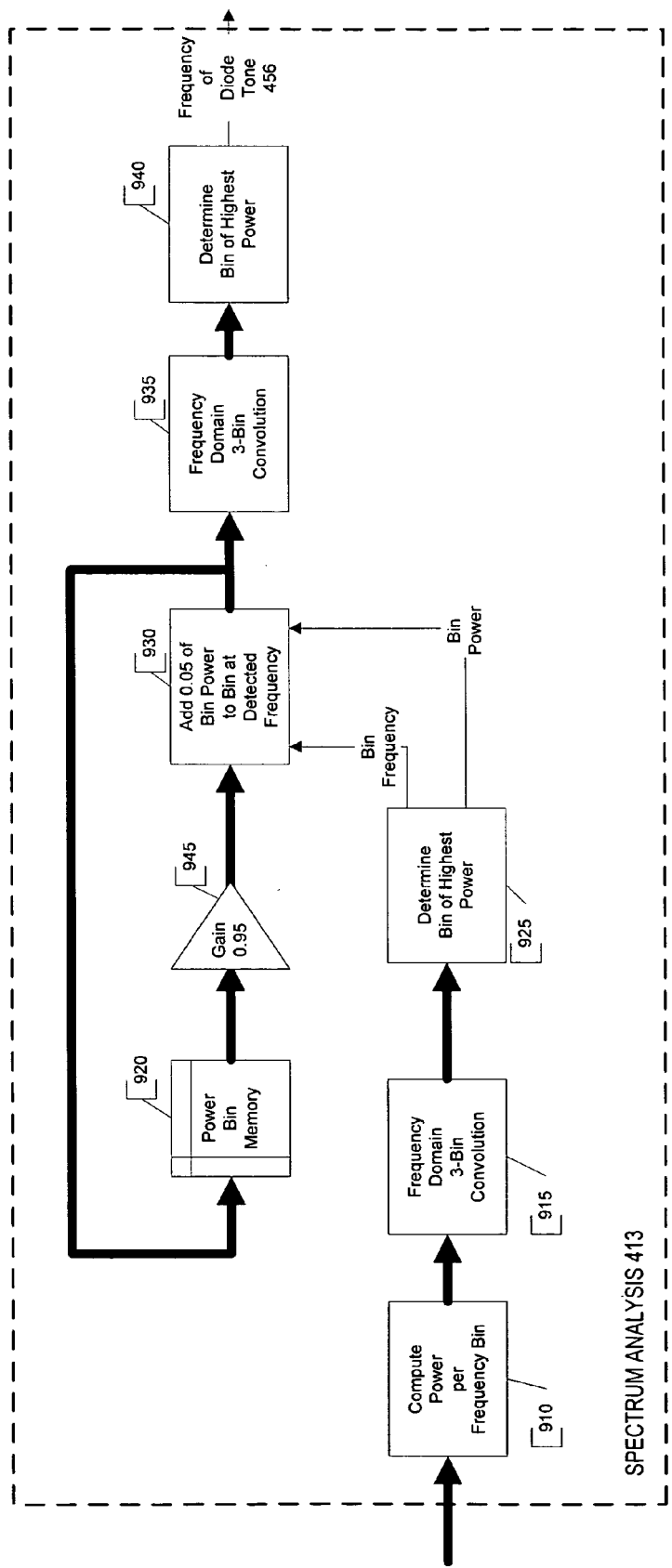
FIG. 9 is a block diagram of the front end spectrum analysis illustrated in FIG. 4 according to an embodiment of the present disclosure.

FIG. 9 is a block diagram of the spectrum analysis 413. The spectrum analysis block 413 finds the center frequency of the diode ripple tone. This is accomplished by first computing the power in each frequency bin 910 and then performing a three-bin convolution 915 across the first 128 bins of the FFT. This convolution averages 3 successive power bins and puts this average into the middle bin. This method puts the frequency power into a specific bin if the frequency in question falls between two bins. Block 925 examines the output of 915 and determines the best frequency location through a series of required logic events. In the illustrated embodiment, only the first 128 bins of the FFT are examined. In general, the largest power bin is the fundamental frequency of the diode tone and it is chosen as the best location. To ensure that the best location is the fundamental frequency of the diode tone, the energy content at half the frequency of the largest power bin is examined. If the power level at this location is less than or equal to ⅛th of the largest power, then the largest power bin and location are chosen as the best. If the half frequency power is greater than ⅛, then its bin location and power value are chosen as the best. This bin location and power value are passed to block 930. Blocks 920, 930, and 945 form what is known as a leaky integrator. Power bin memory 920 is an array of 128 frequency power bins. These values are multiplied by 0.95. The largest bin power determined by 925 is multiplied by 0.05 and added to the power bin memory at the location determined by 915. Zero is added to the remaining 127 bins in the power bin memory. The resulting 128 power bin values are stored back into the power bin memory. This results in a leaky integrator which reinforces the power at the bin frequency location determined by 925 while gradually reducing any extraneous power bin levels. This integrator will asymptotically approach 1, thus remaining stable. The frequency domain convolution 935 performs the same function as 915. Block 940 then selects the largest value of the 128 power bins and determines its location. This location value is then used for the construction of the diode tone frequency domain band pass window filter 415.

Returning to FIG. 4, a complex impulse response bandpass filter 415 may be synthesized using the frequency information determined by the spectrum analysis routine 413. The band-pass slew rate limited signal data 458 is then passed through the over-lapped 1024 running FFT, transforming the bandpass slew rate limited signal data 458 into the frequency domain. This signal is then processed by the complex impulse response bandpass filter 415 in order to extract the complex diode ripple tone. The complex impulse response bandpass filter 415 may also down sample the data by a factor of 4 in the frequency domain. At this point in the processing, the data rate is 25 KHz.

An overlapped 256 running IFFT 417 transforms the diode tone back into the time domain. The complex time domain samples 444 are complex signals that have real and imaginary components. The phase of these complex time domain samples 444 are a function of time and by differentiating this phase, the diode fundamental frequency and the angle modulating signal can be detected. As described above, the angle modulating signal correlates to the variations in the engine speed that occur due to the cylinder firings.

The phase of the diode tone can be determined by using the arctangent function 419 applied to the real and complex components. Phase differentiation 423 is then accomplished by taking the point-to-point difference, which results in detection of the diode tone frequency as well as the variations in this tone or the modulating signal. The signal produced is identified as the decoded engine data 448.

More specifically, the diode ripple data contains an angle modulated tone that is proportional to the engine revolutions per minute (RPM) and the cylinder firing sequence. An angle demodulator (such as the arctangent function 419 and the phase differentiator 423) can be used to detect this tone and its variations. Although the illustrated embodiment describes angle demodulation by phase differentiation, other forms of demodulation may be used. For example, an alternative front end is described below that illustrates another demodulation technique. The angle modulation can be expressed as shown in Equation 1, where is θ(t) a time varying signal. θ(t) is described in Equation 2, where $f_c$ is the diode tone center frequency and ϕ(t) is the varying phase of the diode tone.

$$x(t)=\cos(\theta(t)) \quad (1)$$

$$\theta(t)=2\pi f_c t+\phi(t) \quad (2)$$

By differentiating the phase of x(t), θ(t), the diode tone frequency and its variations can be obtained as shown in Equations 3–5.

$$x(t)=\cos(\theta(t))=\cos(2\pi f_c t+\theta(t)) \quad (3)$$

$$d\theta(t)/dt=d(2\pi f_c t+\theta(t))/dt \quad (4)$$

$$d\theta(t)/dt=2\pi f_c+d\theta(t)/dt \quad (5)$$

Phase differentiation 423 is generally obtained by taking the finite difference of the phase of x(t) from point n to n+1. However, the diode ripple data is a real signal, so the imaginary component is extracted by band-pass filter 415. A complex signal is needed to determine the phase of a signal, and from these complex parts, the phase can be obtained. A complex signal has real and imaginary parts, where the phase can be expressed as shown in Equation 6.

$$\text{phase=arc tan(imaginary part/real part)} \quad (6)$$

If the DSP 140 cannot acquire the diode tone frequency sufficiently from the input signal 105, the signal analyzer 120 may display a notification to the service technician to select an alternative source for the input signal 105 or to check the alternator belt for proper tension. For example, in some vehicles, the power signal being applied to the accessory receptacle may include additional filtering that may complicate diode ripple signal recovery. In this case, it may be more efficient for the service technician to provide the alternator output signal 105 directly from the alternator (or across the negative battery terminal and the alternator case ground) rather than performing more extensive analysis on an equivalent of the alternator output signal 105.

Figure 13:
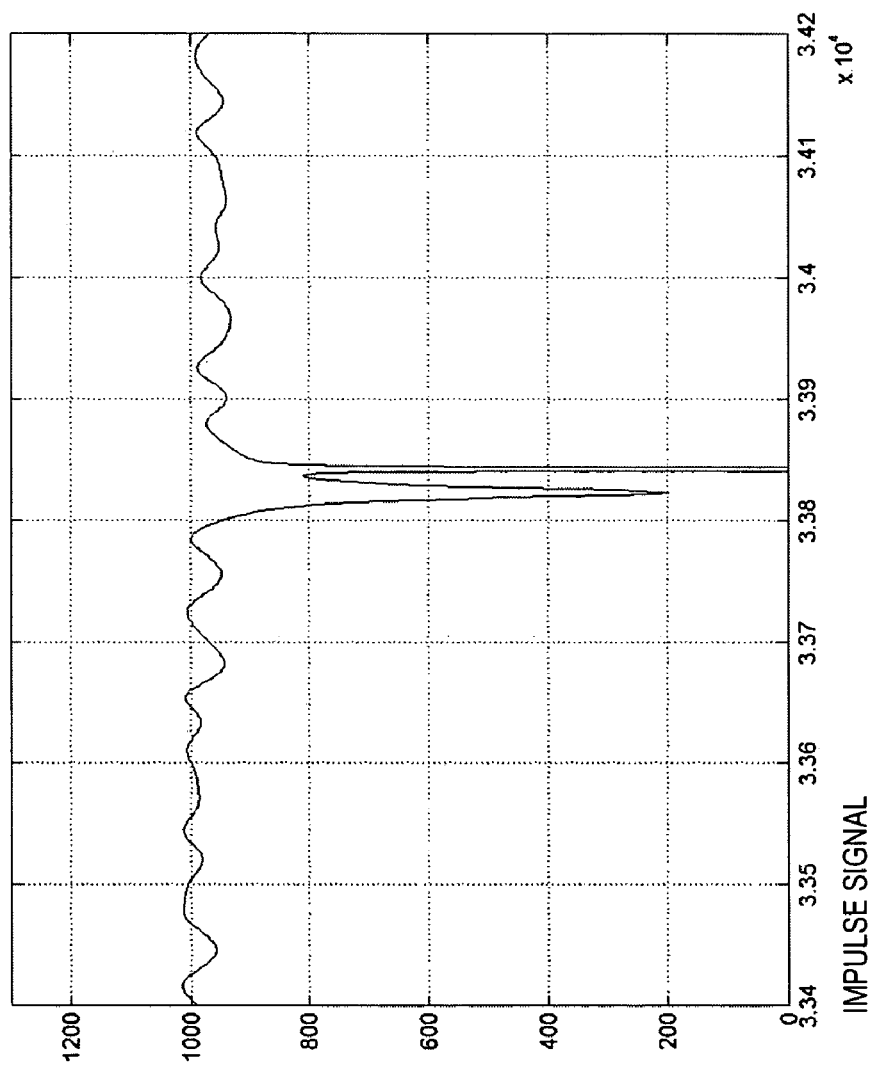
FIG. 13 is a waveform diagram illustrating an impulse according to an embodiment of the present disclosure.

If there are phase discontinuities in the diode ripple tone, the phase differentiator 423 produces large impulses. FIG. 13 shows an example of an impulse in the phase demodulated signal. A slope rate limiter 425 can be used to find these large impulses in the demodulated signal. Once these impulses are found, their location is error tagged and sent to the resampler 429. The amplitude of the error signal is processed as a sample and hold. The sloped limited data is then low pass filtered by an anti-aliasing filter 427 prior to indexing to produce the raw engine data 454.

Figure 8:
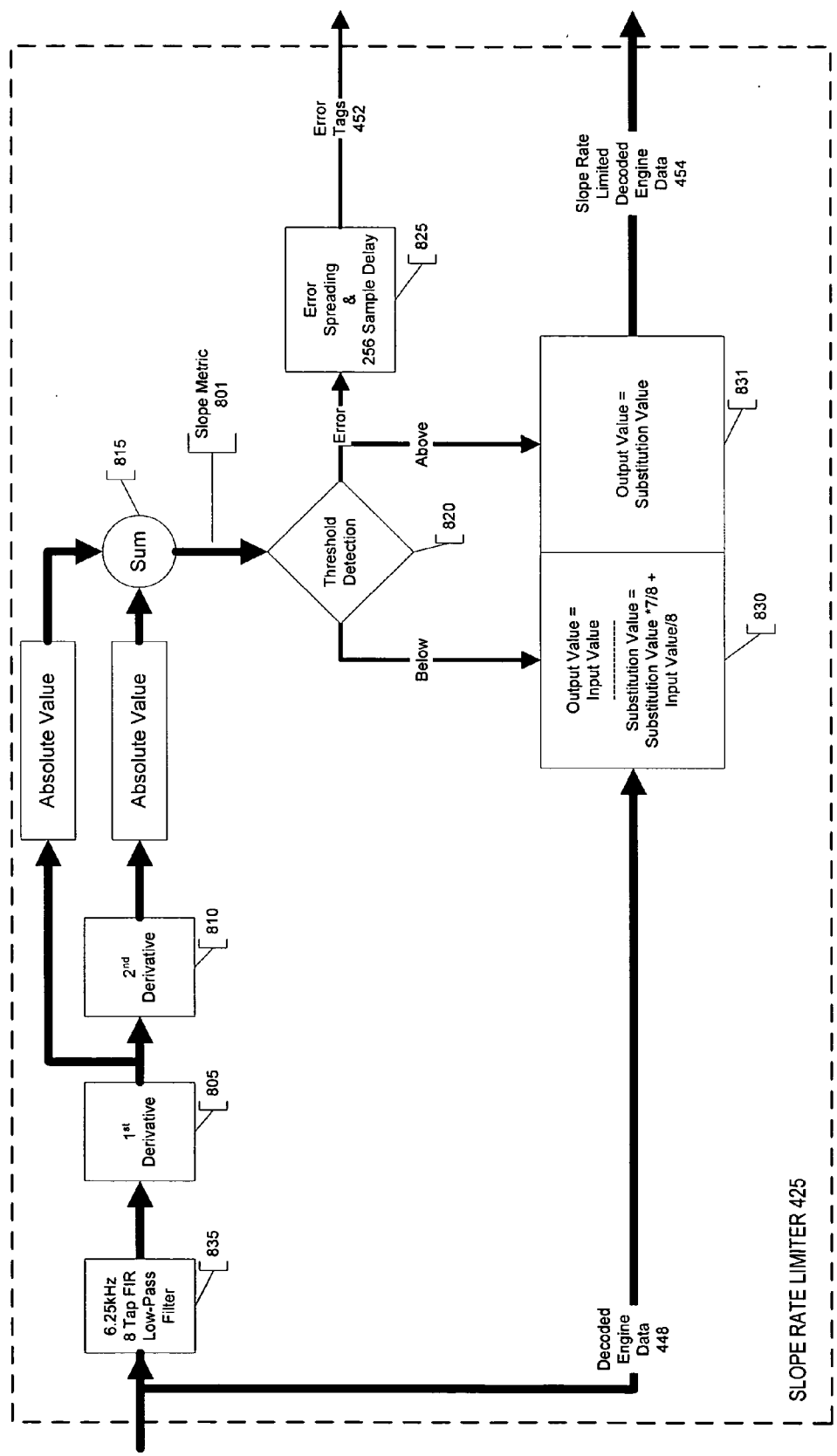
FIG. 8 is a block diagram of the slope rate limiter illustrated in FIG. 4 according to an embodiment of the present disclosure.
Figure 14:
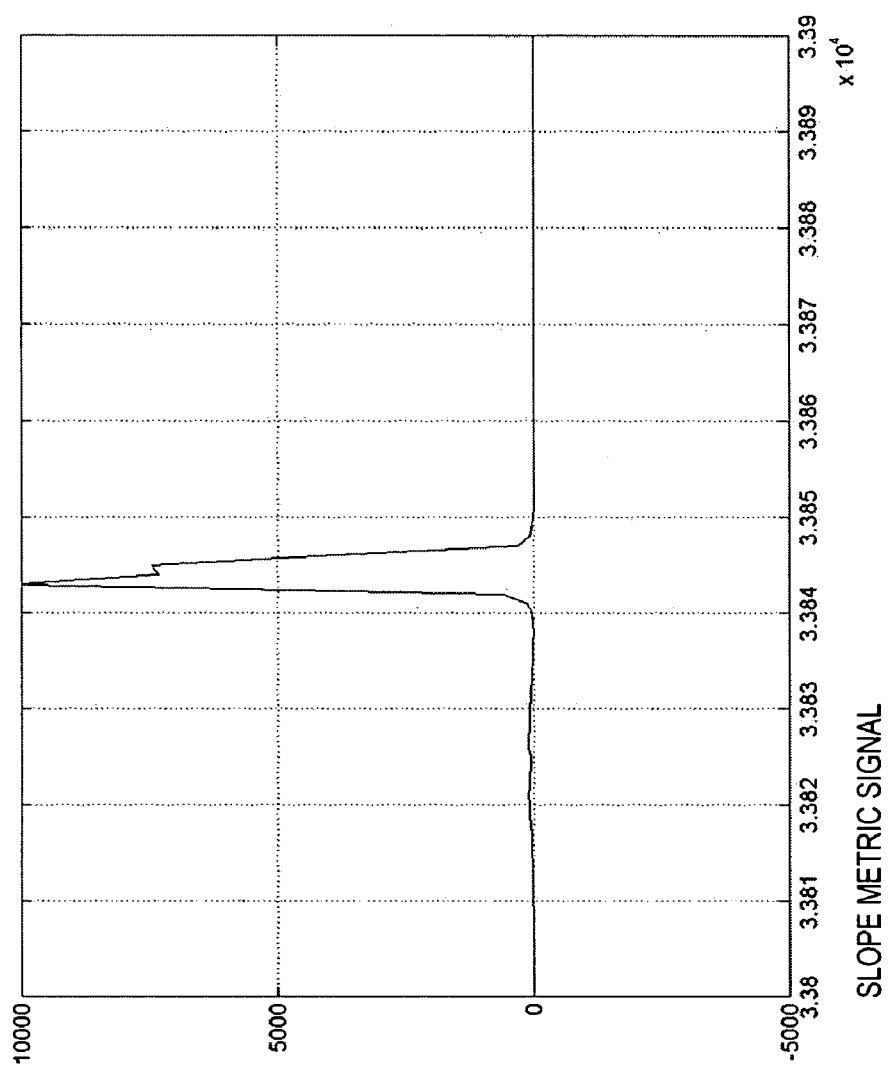
FIG. 14 is a waveform diagram illustrating a slope metric according to an embodiment of the present disclosure.

FIG. 8 is a block diagram of the slope rate limiter 425 according to an embodiment of the present disclosure. The slope rate limiter 425 detects impulses, removes them, and reconstructs the signal using, for example, a sample and hold routine. The phase demodulated signal is received by a 6.26 KHz 8 tap low-pass FIR filter 835, and then processed by a first derivative block 805. The first derivative block 805 differentiates the signal and takes the absolute value of the derivative. A second derivative block 810 differentiates the first order derivative and takes the absolute value of the resulting second order derivative. The first order and second order derivatives are then added together by an adder 815 to produce a slope metric 801. FIG. 14 shows an example of a slope metric signal.

Figure 15:
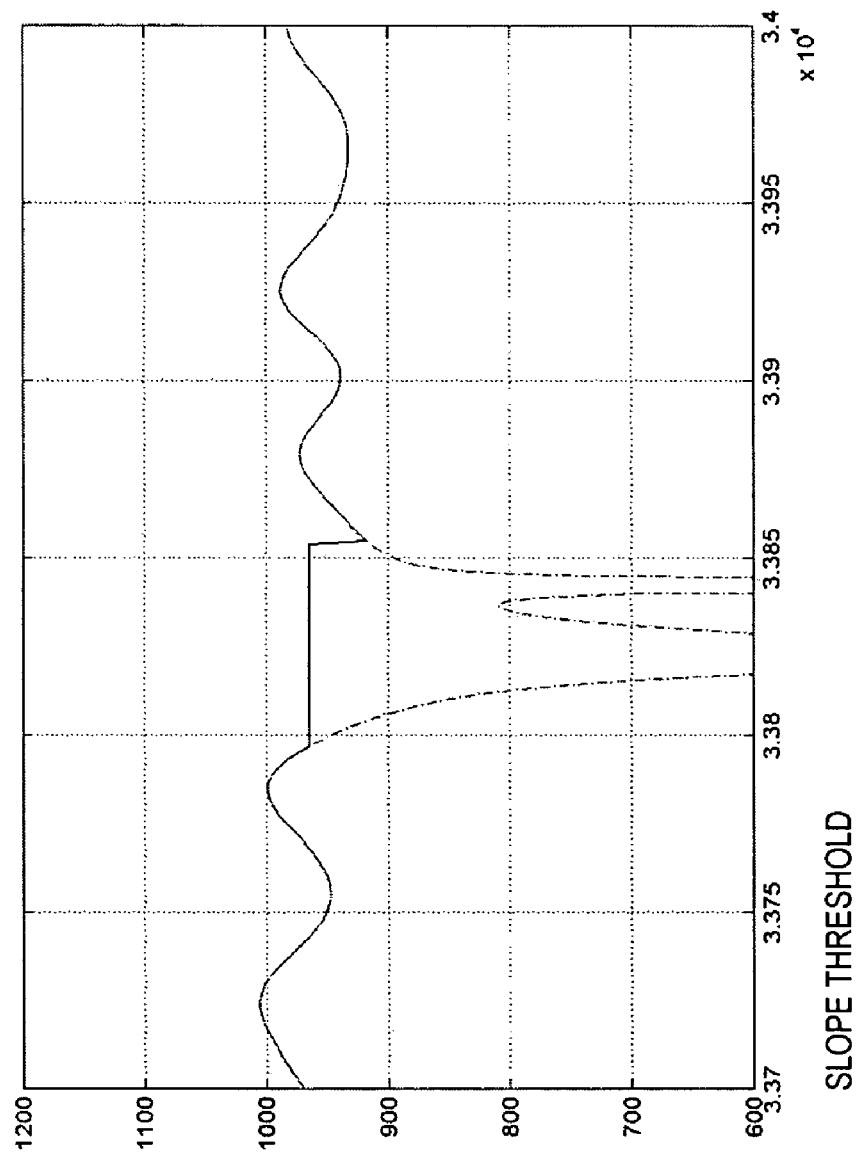
FIG. 15 is a waveform diagram illustrating a slope sample and hold operation.

The slope metric signal 801 can be used as a metric for determining the length (i.e., number of samples) of the detected impulse. The slope metric signal 801 is compared 820 to a reference value. The reference value is a value selected to be the maximum allowable the slope of the signal. A counter is incremented and stopped once the slope of the signal falls below the reference. FIG. 15 shows an example waveform diagram in which the slope of the signal has exceeded the reference value and the sample and hold employed. For example, if the reference level is 20, then the comparing 820 examines the slope metric signal and produces a pulse equivalent in length when the slope metric signal 801 exceeded a value of 20. In FIG. 15, phantom or dotted lines are used to illustrate the signal before the application of slope rate limiting.

The embodiment illustrated in FIG. 8 includes a sample and hold reconstruction 831 approach. The threshold detection 820 compares the slope metric 801 to a threshold. If the threshold is reached, then an error signal is sent to the error spreading and delay block 825. This error remains set until the slope metric falls below the threshold. The spreading routine is used to widen this error to guarantee the error signal being a significant value after the error tag 452 is down-sampled by the filtered diode ripple indexing tone 450. When the threshold detection 820 is set, the slope rate limited decoded engine data is set equal to the substitution value. If the threshold detection 820 is below the threshold, then the slope rate limited decoded engine data 454 is set equal to the decoded engine data 448. The substitution value is recomputed using Equation 7.

$$\text{substitution value} = \text{substitution value}*7/8 + \text{decoded engine data}/8 \quad (7)$$

Returning to FIG. 4, the slope limited, demodulated data is related to the engine signature. However, it is advantageous to express this data independent of the engine RPM and consequently diode ripple tone frequency. In the illustrated embodiment, an indexer 429 uses the diode ripple tone frequency as an index for sampling the angle demodulated signal. This indexing uses the real part of the diode tone 446 as the sampling frequency. The real part of the diode tone 446 is differentiated twice 431, 433. This process provides for consecutive zero crossings that guarantee no missing engine data sample points. Of course, the dual differentiation may be viewed as a filter. The zero crossing detector 421 senses the positive or negative zero crossing of the diode ripple tone and provides this information to the indexer 429 as the sampling signal. The indexer 429 effectively down samples the data by the ratio of 25 KHz/diode tone frequency to yield a signal with a time base that is independent of engine RPM and diode ripple tone frequency. After indexing, the data provided to a storage unit 340. The indexed data can be referred to as raw indexed engine data 310. The resampler 429 also provides other data related to the raw indexed engine data. Data tags 315 consist of an external trigger, a time base and error tags and a signal indicating the number of samples per block 320.

The raw indexed engine data 310 may also be concurrently provided to the back end 355 for further processing. The back end 355 may also retrieve the raw indexed engine data from the storage unit 340 in real-time (i.e., via multiple concurrent read/write ports) or subsequently in an offline processing mode.

An additional feature allows the indexing block 429 to produce data at one half the frequency of the filtered diode ripple indexing tone 450. Some vehicles are equipped with non-standard alternators which produce over 430 zero crossings per engine cycle (some alternators produce as many as 1000 zero crossings per engine cycle). Because this may be a considerable amount of data to process, the indexing block 429 can discard every other raw indexed data sample 310 and data tags 315.

2. Alternative Front End

FIG. 11 is a block diagram of the front end illustrated in FIG. 3 according to another embodiment of the present disclosure. As outlined above, other methods may be used for decoding the diode ripple tone to extract the raw indexed engine data. The illustrated embodiment measures the periodicity of the diode ripple tone by measuring the time between successive zero crossings. As one skilled in the art will recognize, there are some functional blocks that are common to the embodiment illustrated in FIG. 4. Specifically, they are the overlapped 1024 running FFT 411 (1111), and the spectrum analysis 413 (1113). The IFFT 417 and 1117 differ in that the IFFT 417 has a length of 256 while IFFT 1117 has a length of 1024. The frequency domain band-pass filter is not the same for the illustrated method because downsampling by 4 (as described with respect to FIG. 3) would degrade the performance in this case. For the embodiment illustrated in FIG. 11, one skilled in the art will appreciate that diode ripple may be sampled at a rate that is higher than 100 kHz. For example, a sample rate of 200 kHz or higher may be advantageous for increased performance. When increasing or adjusting the sample rate, the length of the FFT 1111 and of the IFFT 1117 may be increased or adjusted accordingly.

Frequency and period are inverse functions, so the diode ripple tone frequency can be written as shown in Equation 8, where $P_{diode\_tone}$ equals the time between positive zero crossings.

$$F_{diode\_tone} = 1/P_{diode\_tone} \quad (8)$$

Period measurement measures the time period in samples of the real time domain signal 1118. The positive zero crossing detector 1121 determines when the real time domain signal 1118 has crossed zero in the positive direction. A signal is sent to period sample counter 1123. This counter starts counting at the sampling rate. When the zero crossing detector senses another zero crossing, the value in the period sample counter is then stored in store sample count 1125. The period sample counter then is reset and the process starts over. The store sample count block 1125 has now measured the period of the diode ripple tone. This period varies with the phase modulation of the diode ripple tone. Thus the diode ripple tone is decoded as a variation of the diode tone period. Because the zero crossings are used as the strobe to store the diode tone period, the engine data is effectively indexed by the diode tone frequency. The output is the raw indexed engine data 310.

3. Back End

Figure 5:
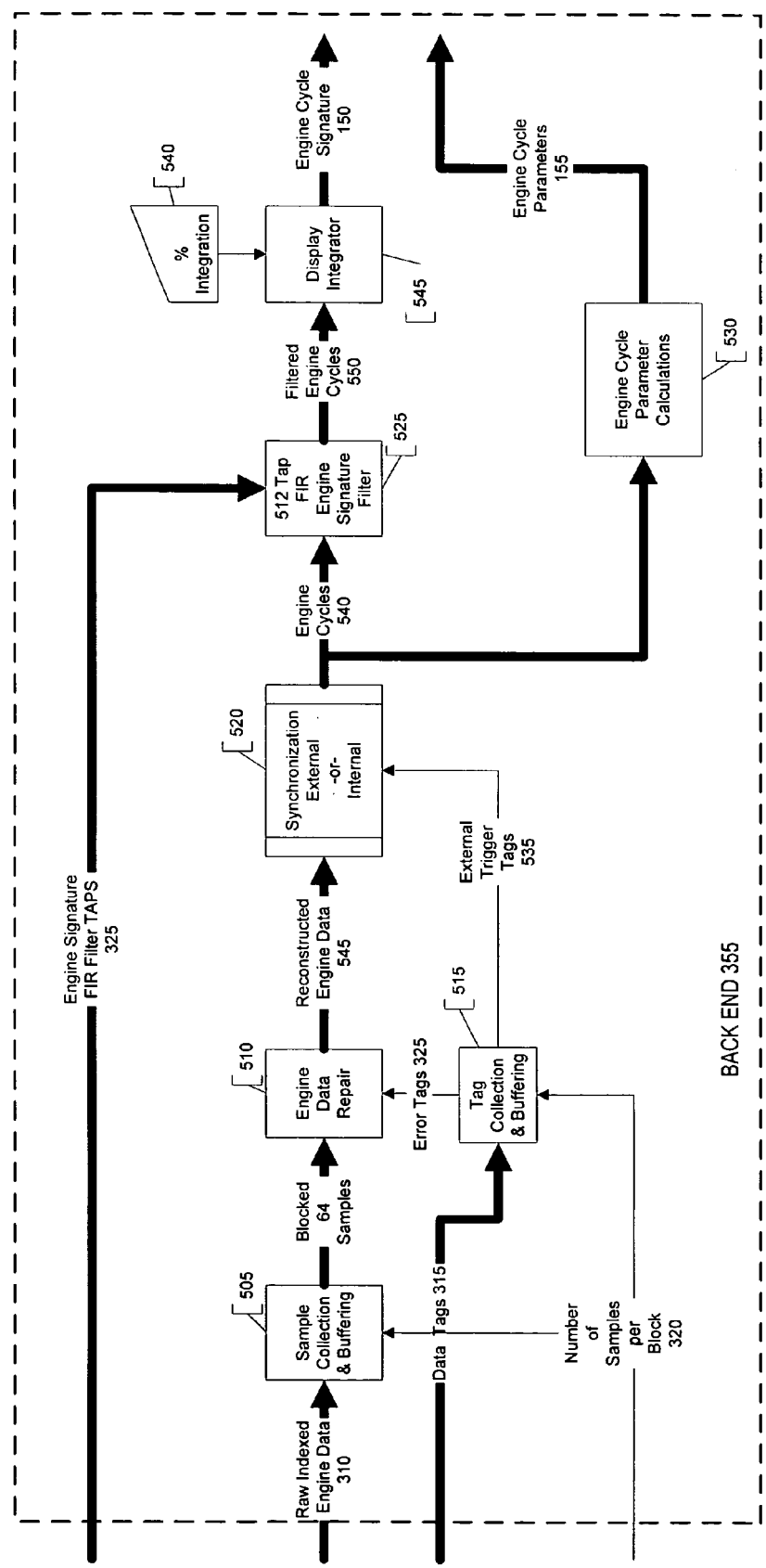
FIG. 5 is a block diagram of the back end illustrated in FIG. 3 according to an embodiment of the present disclosure.

FIG. 5 is a block diagram of the back end illustrated in FIG. 3 according to an embodiment of the present disclosure. The back end 355 processing includes taking the raw indexed engine data and processing it into engine signature data. The engine signature data includes firing cycle information for each cylinder. For example, if the engine under test is a six-cylinder engine, then the engine signature data displays or includes information corresponding to six cylinder firings.

The raw indexed engine data 310 is collected in a sample buffer 505, synchronized by the number of samples per block 320. This block of data enters the engine data repair block 510. The data tags 315 go into a tag collection buffer 515. These data tags provide information as to where the error occurs in the raw engine data which is used for data reconstruction.

The engine data repair 510 uses a first order approximation for reconstructing the engine data that has errors. The error tag indicates where the engine data is error. The engine data repair determines the last good data point and the next good data point from the error tags. A first order slope, m, is determined using these points by Equation 9, where x(n−k) is the last good data point, x(n) next good data point, and k is the length of the error.

$$m=(x(n)-x(n-k))/k \tag{9}$$

Figure 16:
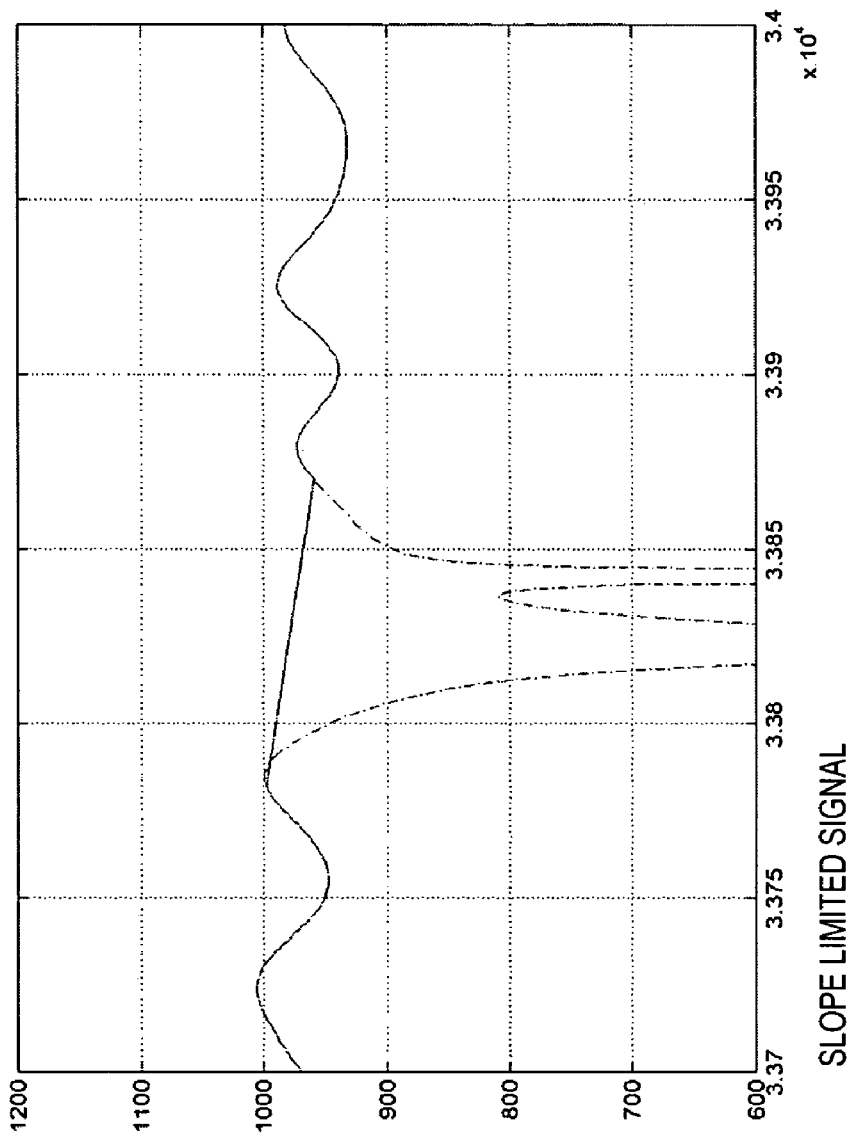
FIG. 16 is a waveform diagram illustrating a first order slope approximation.
Figure 17:
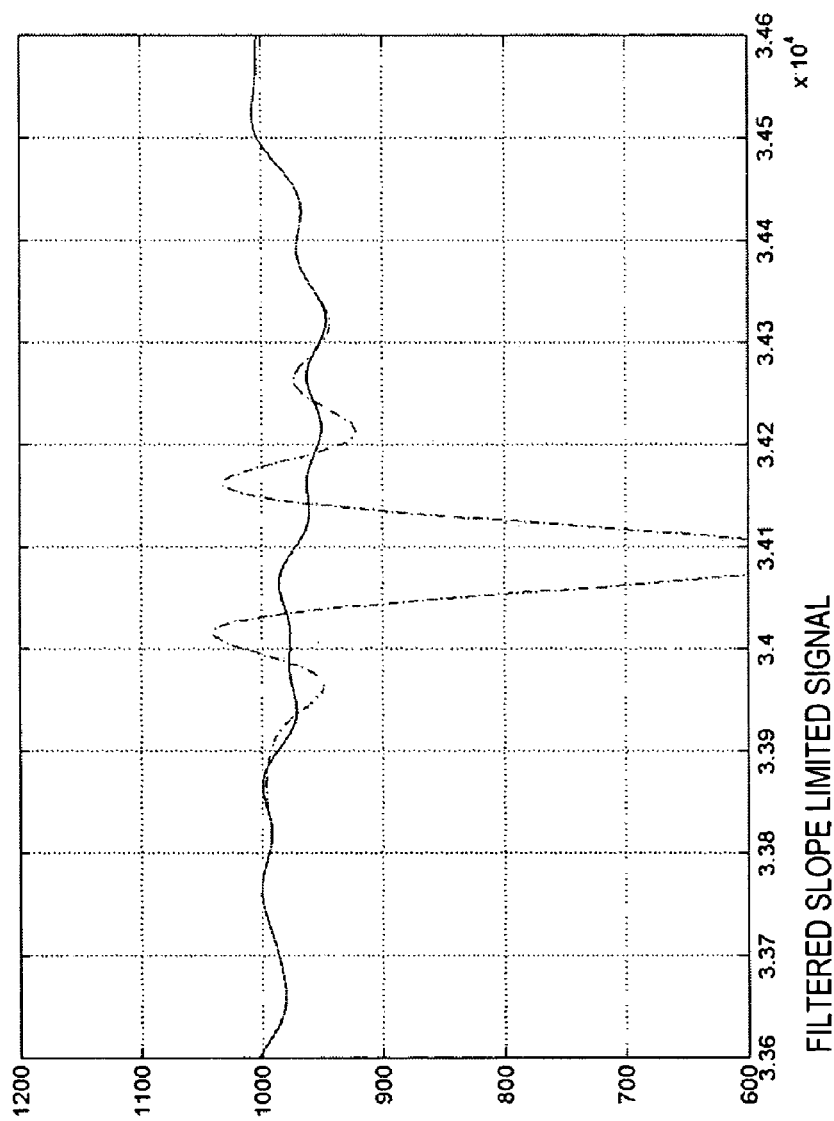
FIG. 17 is a waveform diagram illustrating a filtered slope limited signal.
Figure 18:
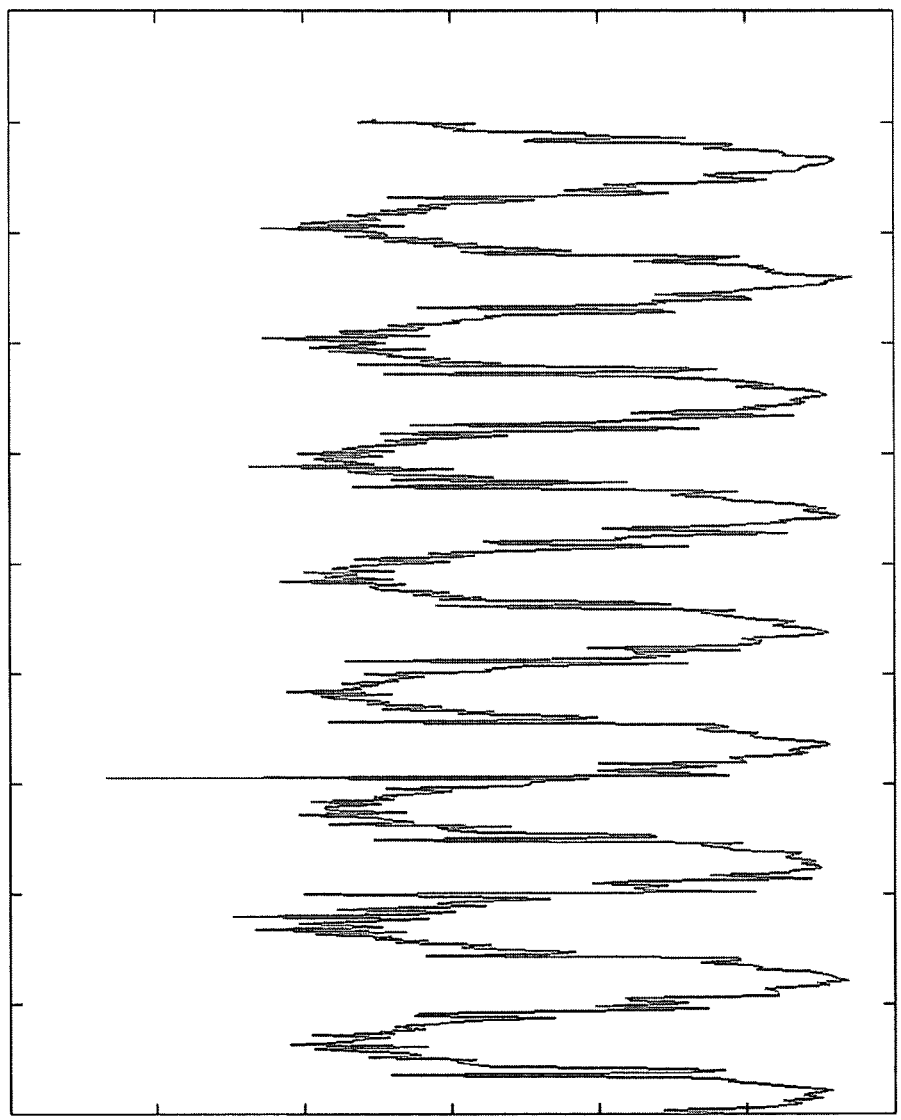
FIG. 18 is the waveform diagram illustrating raw indexed engine data 310 according to an embodiment of the present disclosure.

Once the slope is determined, the engine repair routine 510 uses Equation 10 (where i=1 to k) for data reconstruction. FIG. 16 shows this signal. In FIG. 16, phantom or dotted lines are used to illustrate the signal before the reconstruction.

$$x(n-k+i)=m \times x(n-k+i-1) \tag{10}$$

The reconstructed engine data 545 and the external trigger tags 535 are then used by the synchronization block 520 to produce the engine cycles signal 540. Further details of the synchronization block are described below and with reference to FIG. 6.

After synchronization 520, the engine cycles data 540 passes through the 512-tap FIR engine signature filter 525 (determined by adjustable FIR Taps 325) to smooth the reconstruction for subjective presentation. This signal is then given to the display integrator 545 for more filtering which produces the engine cycle signature 150. The engine cycles signal 540 is also provided to the engine cycle parameter calculator 530, which passes on the engine parameters 155 to the display processor. The engine cycle parameter calculator 530 computes the RPM per engine cycle as the mean value of the RPM of engine cycles signal 540. Specifically, each point of engine cycles signal 540 is a value representing the frequency of the diode ripple. The mean over an engine cycle is taken and divided by the number of indexed samples per engine cycle 626. This value is multiplied by 60 seconds/minute and 2 revolutions per engine cycle to yield the RPM per engine cycle.

The display integrator 545 operates by filtering each individual display pixel column with the corresponding value from previous engine cycles. For example, there are 500 display values representing an engine cycle. The first new display value is weighted and added to the previously displayed value also weighted. Specifically, if setting of 70% is selected 540, the new display value is multiplied by 0.3 and the previously displayed value is multiplied by 0.7 and the two values are added to produce a new display value. This process is repeated for each of the display values (e.g., 500 values) across the horizontal axis of the display.

4. Synchronization 520

Figure 6:
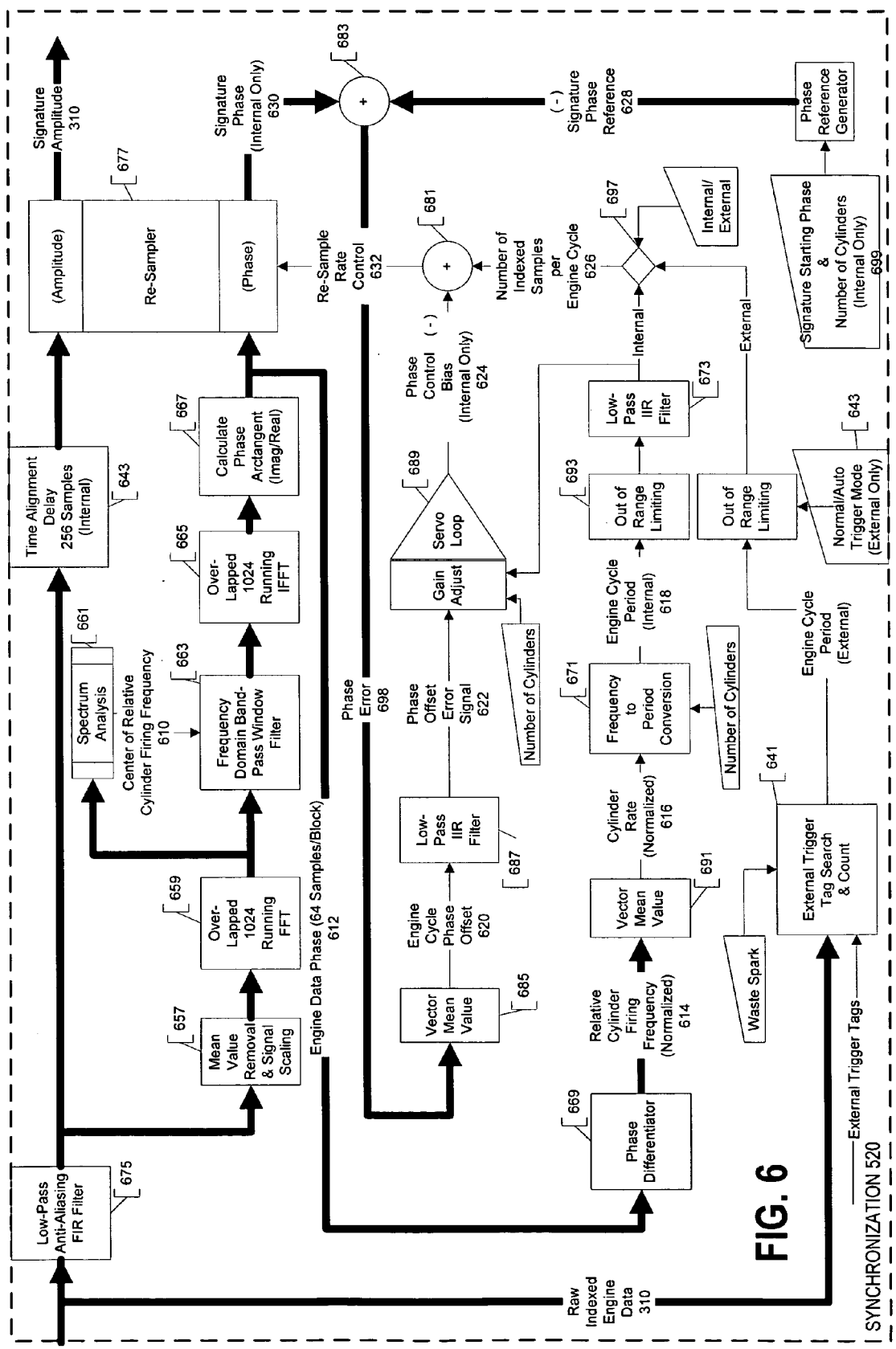
FIG. 6 is a block diagram of the synchronization block illustrated in FIG. 5 according to an embodiment of the present disclosure.

FIG. 6 is a block diagram of the synchronization block 520 according to an embodiment of the present disclosure. In order determine the engine signature 150, the engine cylinder firing frequency is first determined. The raw indexed engine data 310 is processed by low-pass anti-aliasing FIR filter 675. A mean removal and scaler routine 657 calculates the mean of the data and then subtracts the mean from the data. This maximizes the dynamic range for a fixed point overlapped 1024 running FFT 659. The overlapped 1024 running FFT 659 transforms the raw indexed engine data into the frequency domain and the spectrum analyzer routine 661 locates the cylinder firing frequency. The cylinder firing frequency is relative to the frequency of the indexing tone 450. Additional details of the spectrum analysis 661 are described below and with reference to FIG. 10.

A complex impulse response band pass filter 663 is synthesized. The output of the over-lapped 1024 running FFT is then filtered by frequency domain filter 663. After filtering, an overlapped 1024 running IFFT 665 is performed in order to transform the signal back into the time domain. The output of the anti-aliasing FIR filter 675 is time delayed by 643 to time align the signals entering the resampler 677.

The phase of this time domain signal is calculated using the arctangent function 667 and presented to the resampler 677. The functionality of the resampler 667 is further described below. The engine data phase signal 612 is differentiated 669 to yield the relative cylinder firing frequency 614, which is averaged 691 and converted 671 to a period related to the number of cylinder firings and the number of cylinders. The period is in terms of the number of indexed samples per engine cycle. This engine cycle period is provided to an out-of-range limiting block 693 and then to an infinite impulse response (IIR) filter 673. Equation 11 defines the period y(x(n)), where x(n) is the mean.

$$y(x(n))=2\pi * \text{number of cylinders}/x(n) \tag{11}$$

As can be appreciated from Equation 11, the frequency to period converter 671 receives as an input the number of cylinders. The number of cylinders may be provided in a number of ways, as one skilled in the art will appreciate, including keyboard entry or database lookup or decoding of the vehicle identification number (VIN). Furthermore, an additional signal can be provided to the signal analyzer 120 for use in determining the number of engine cylinders. For example, a voltage clamp placed on a cylinder spark plug wire can be used to provide a periodic input signal that corresponds with an engine cycle. In an embodiment, the inductive pickup 113 is used to determine the number of indexed samples per engine cycle, which consequently displays the correct number of cylinders.

The number of samples per period of the raw indexed engine data that are determined 626 per engine cycle are forwarded to the resampler 677. The phase of the cylinder firing 612 is also forwarded to the resampler 677. This is used to synchronize the output of the resampler 677 to start at the 0 degree (selectable) point in the raw indexed engine data. A fixed phase starting position is advantageous so that a waveform display of the output data is more understandable to the service technician.

Figure 20:
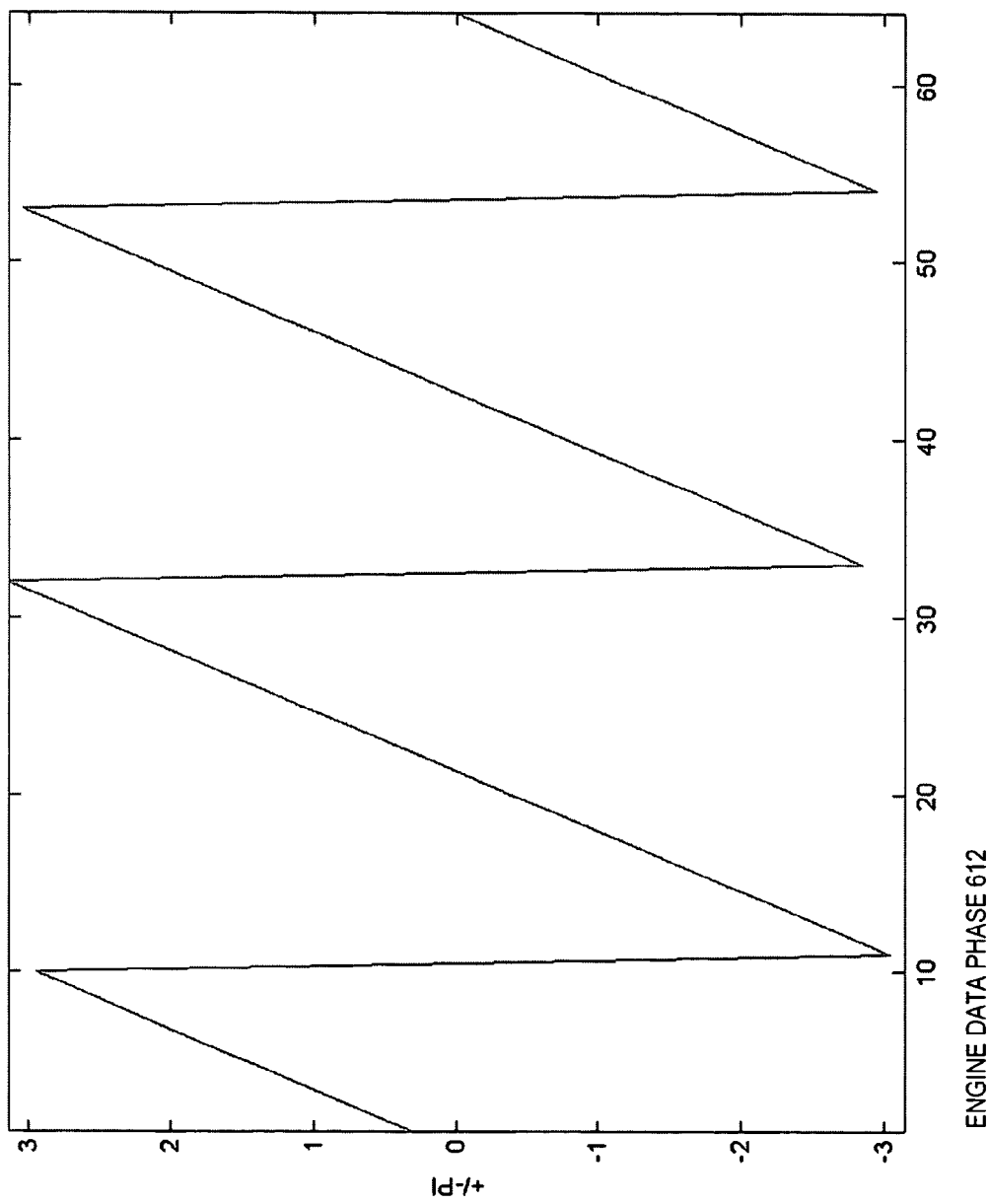
FIG. 20 is a waveform diagram illustrating an engine data phase 612 according to an embodiment of the present disclosure.

A resample rate control signal 632 is generated to control the phase out put of the Signature Amplitude 310. The signature phase 630 (illustrated in FIG. 20), of the signature amplitude 310 is compared to a signature phase reference 628. This signature phase reference 628 is generated internally depending on the number of cylinders (internal trigger only) 699. A phase error 698 is developed based on the difference of the reference phase 628 and the signature phase 630. The phase error 698 consists of the number of display points (e.g., 500 points). These display points are provided to a vector mean value block 685, which takes the average of the display points creating the engine cycle phase offset 620. This signal is processed by a lead-lag digital filter 687, creating a phase offset error signal 622. The signal 622 is amplified by the gain adjust servo loop. The number of cylinders and the engine cycle period determine the gain of this block cycle period. The output of the servo loop 689 and the number of indexed samples per engine cycle 626 are added to together creating the re-sample rate control 632. This process produces a second order closed loop servo mechanism that displays the signature amplitude starting point at 0 degrees (or at some other selected starting phase position).

Alternatively, the external trigger tags 641 may be used in place of blocks 669,691,671,673,685,687,689,657,659,661, 663,665,667. In this case the number of raw indexed engine data points 310 is counted over the interval between the external trigger tag locations. This is followed by out of range limiting 693. If the external trigger tags are missing, the resultant trigger may be determined one of two ways. When a normal trigger mode is selected, amplitude and data entering the re-sampler 677 are discarded resulting in no data output from 677. When an automatic mode is selected, the out of range limiting block 693 is allowed to set the number of samples per engine cycle to a predetermined maximum.

Figure 10:
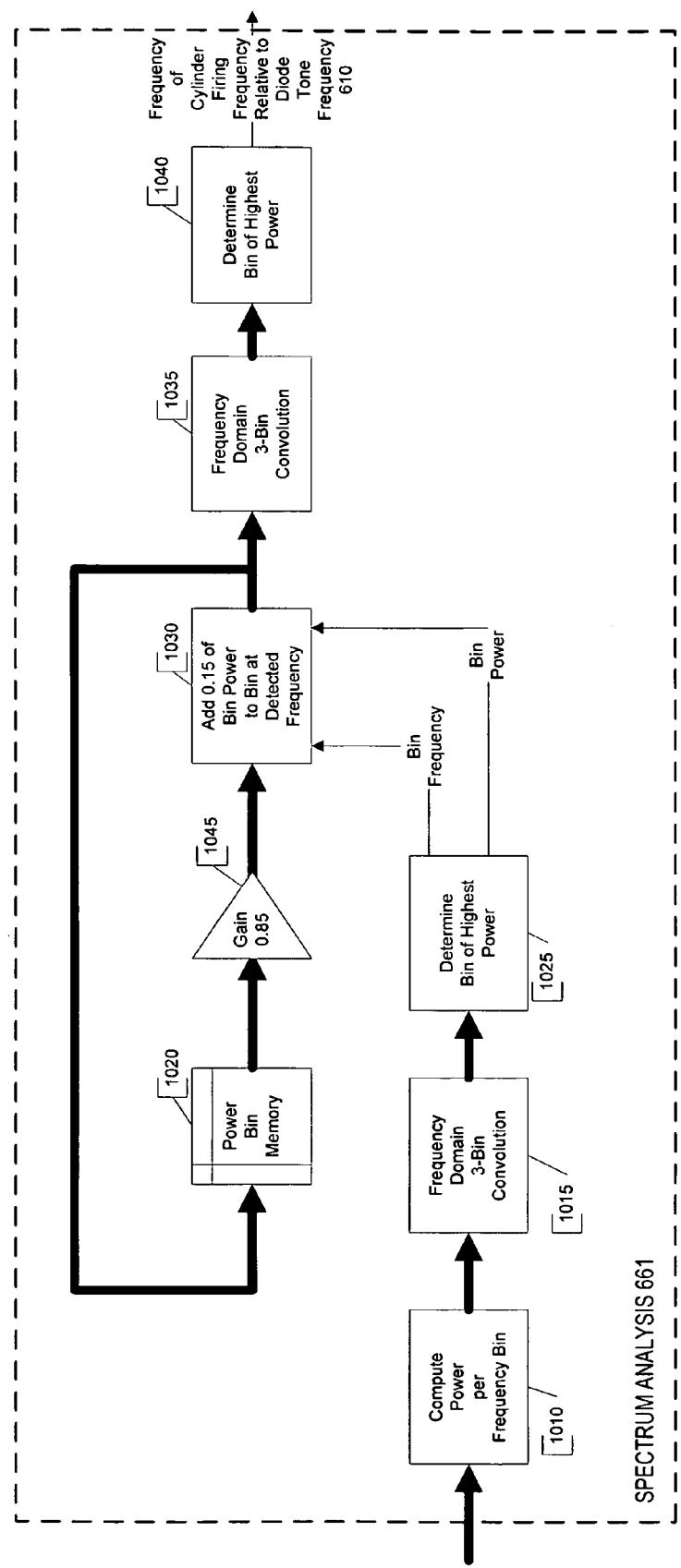
FIG. 10 is a block diagram of the back end spectrum analysis illustrated in FIG. 6 according to an embodiment of the present disclosure.
Figure 11:
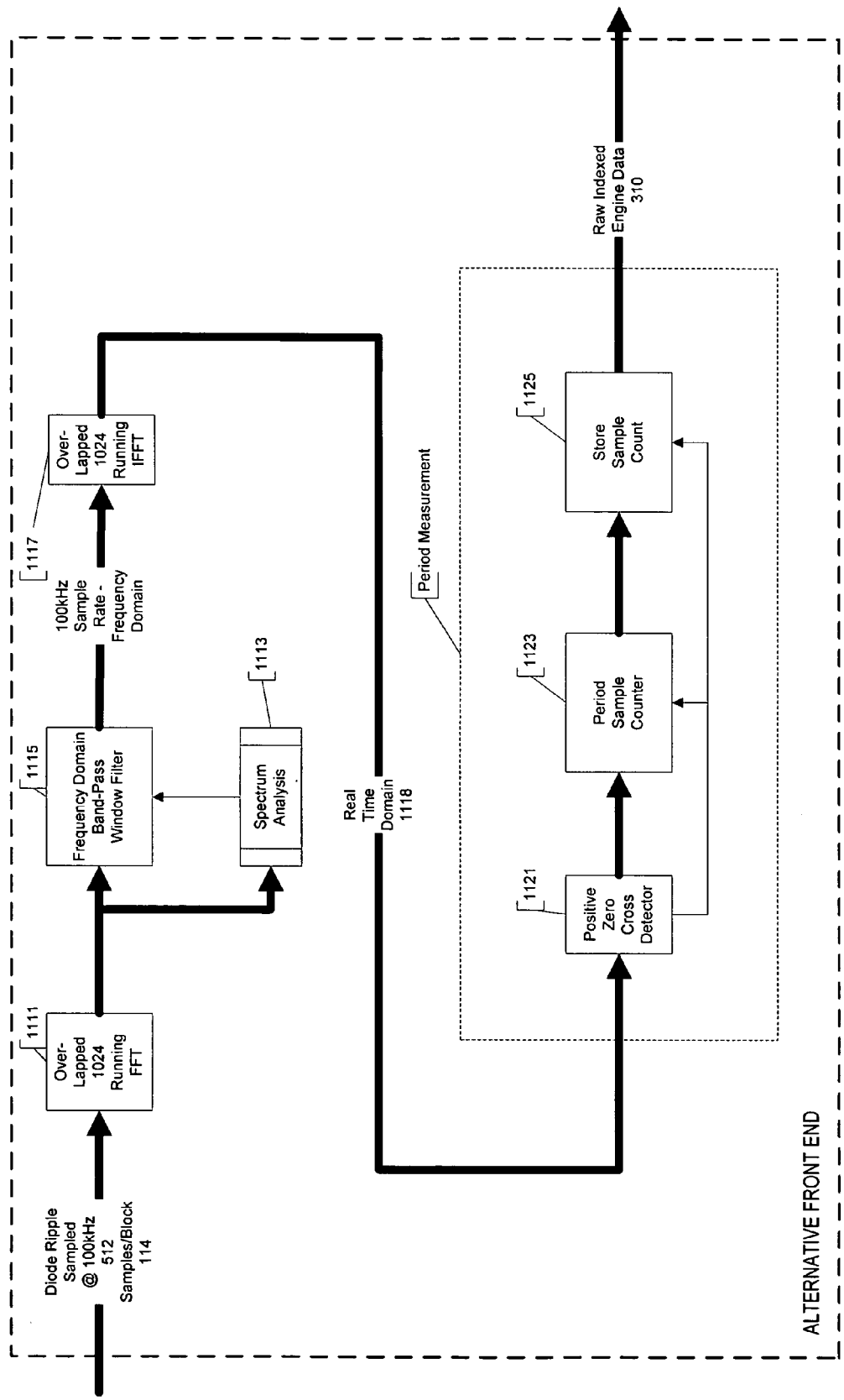
FIG. 11 is a block diagram of the front end illustrated in FIG. 3 according to another embodiment of the present disclosure.

FIG. 10 is a block diagram of the spectrum analysis 661 according to an embodiment of the present disclosure. The spectrum analysis block 661 is similar in operation to spectrum analysis 413 except for two items. Instead of multiplying the best power by 0.05, block 661 multiplies the best power by 0.15. If the tone at the one-half frequency is larger than one-half the amplitude of the largest tone, the largest tone may be considered as a harmonic of the cylinder tone. In this case, the one-half frequency tone is chosen as the cylinder firing frequency.

5. Resampler 667

The number of raw indexed engine data samples per engine cycle (which may be determined by the cylinder firing frequency) may have numerous values. Typically these values range from 120 samples to 430 samples per engine cycle depending on physical parameters, such as the alternator pulley ratio. Additionally, some alternator systems may have 430 to 800 samples per engine cycle. In these cases, the front end 305 operates in the one-half rate mode, as described above and with reference to indexing block 429. Therefore the processing load of converting the raw indexed engine data to a fixed number of engine signature data points, i.e. 500, may vary.

As described above, it is possible to have different periods for different engine signatures, depending on the number of cylinders and the vehicle's charging system construction. As an example, if an engine has an engine signature period of 150 points, the resampler 677 may output 500 points. For this example, the resampling ratio is 150 to 500. This implies that 500 points are interpolated from 150 points. As one skilled in the art will appreciate, the resampler 667 may or may not include the original data points in the output. In an embodiment of the present disclosure, the resampler 677 uses a linear weighted interpolation to construct the extra data points.

An interpolation example for a few data points is provided below for a resampling ratio of 150/500 or 0.3. An output counter, m, is incremented by 1 and an input counter, n, is incremented by the ratio, in this case 0.3. The first output point is calculated by taking the nth input point and multiplying it by 1-counter fraction, adding the nth+1 input times the counter fraction and dividing the sum by 2. An example calculation is illustrated in Equations 12–14.

$$\text{output}(m) = (\text{input}(n) * (1-\text{fraction}) + \text{input}(n+1) * \text{fraction}) / 2 \quad (12)$$

$$\text{output}(1) = (\text{input}(1) * (1-0.3) + \text{input}(2) * 0.3) / 2 \quad (13)$$

$$\text{output}(1) = (\text{input}(1) * (0.7) + \text{input}(2) * 0.3) / 2 \quad (14)$$

The output counter is incremented by 1 and the input counter is incremented by 0.3. The input counter is now 0.6. Because the counter did not roll over to the next integer, the same input data points will be used as illustrated in Equations 15–17.

$$\text{output}(m+1) = (\text{input}(n) * (1-\text{fraction}) + \text{input}(n+1) * \text{fraction}) / 2 \quad (15)$$

$$\text{output}(2) = (\text{input}(1) * (1-0.6) + \text{input}(2) * 0.6) / 2 \quad (16)$$

$$\text{output}(2) = (\text{input}(1) * (0.4) + \text{input}(2) * 0.6) / 2 \quad (17)$$

The output counter is incremented by 1 and the input is incremented by 0.3. This yields an input counter equal to 0.9 and an output counter equal to 3. Thus Equations 18–19 define the output equation.

$$\text{output}(3) = (\text{input}(1) * (1-0.9) + \text{input}(2) * 0.9) / 2 \quad (18)$$

$$\text{output}(3) = (\text{input}(1) * (0.1) + \text{input}(2) * 0.9) / 2 \quad (19)$$

Incrementing the output counter again yields an output counter equal to 4 and incrementing the input count by 0.3 yields 1.2. Because the input count rolled over to 1, the input data used is incremented by 1. The fractional part of 0.2 is used as the scaling factor, as shown in Equations 20–21.

$$\text{output}(4) = (\text{input}(2) * (1-0.2) + \text{input}(3) * 0.2) / 2 \quad (20)$$

$$\text{output}(4) = (\text{input}(2) * (0.8) + \text{input}(3) * 0.2) / 2 \quad (21)$$

Of course, the interpolation process is performed iteratively or recursively until the desired number of output data points (e.g., 500 points) is reached. At this point, the synchronization sub-system presents a complete engine cycle having 500 display points.

Figure 19:
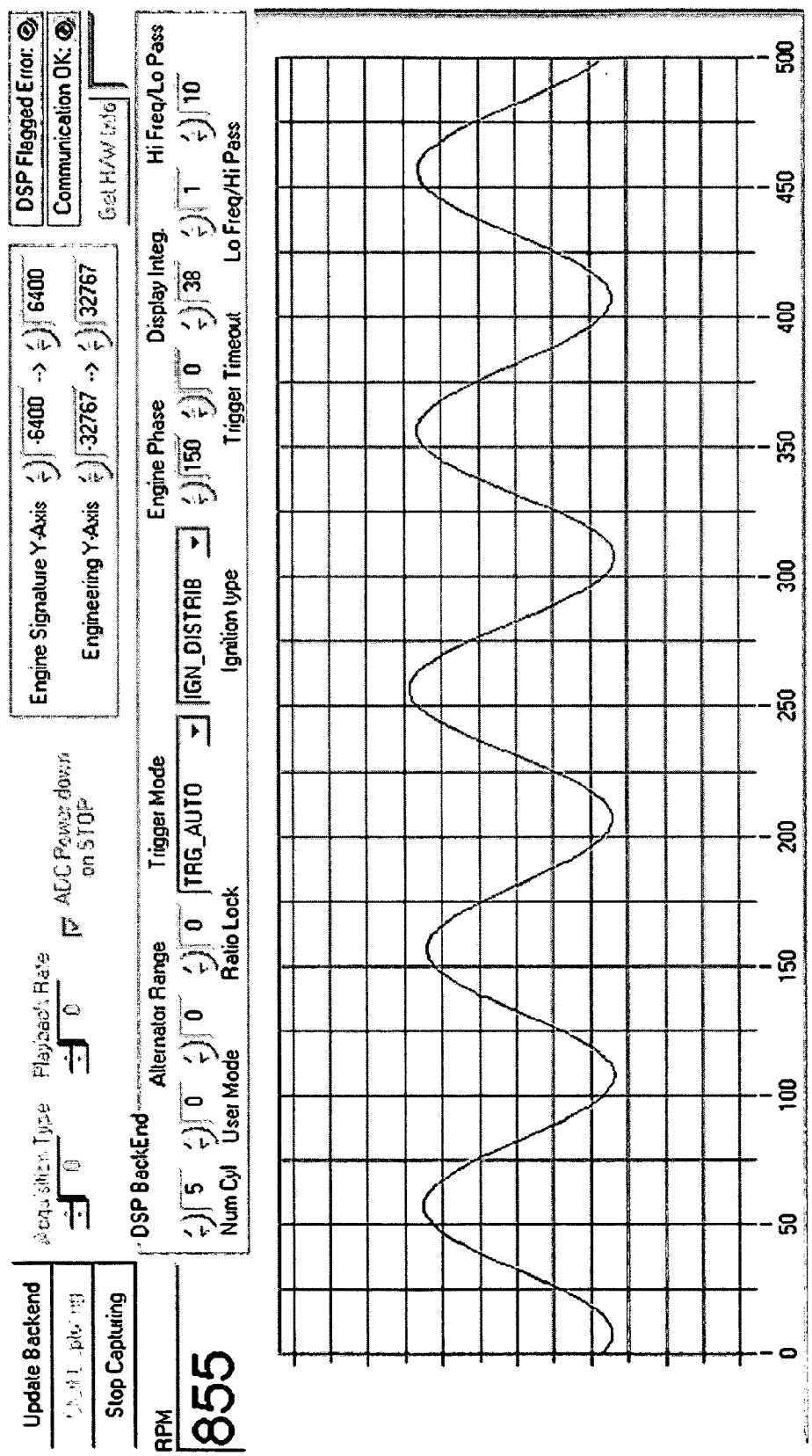
FIG. 19 is a waveform diagram illustrating an engine cycle signature 150 according to an embodiment of the present disclosure.

The normal engine signature shows a small amount of change in the engine speed as each of the cylinders fire. FIG. 19 shows an example engine signature for a 5 cylinder engine. In this case, each cylinder of the engine is contributing approximately equally to the total power output. Specifically, if the peak-to-peak amplitude of the signal is the same for all cylinders, then all cylinders are contributing equally to the total power output.

On the other hand, the poorly contributing cylinder engine signature indicates a contribution problem with one of the cylinders. When a cylinder fails to contribute equally, the engine speed responds to this lack of a single power stroke and slows accordingly. Specifically, if a particular cylinder is contributing less than the average of the other cylinders, the power stroke fails to generate the engine speed needed to maintain a steady state peak-to-peak amplitude.

Having described embodiments of determining engine cylinder contribution from indexed engine data (which are intended to be illustrative and not limiting), it is noted that modifications and variations can be made by persons skilled in the art in light of the above teachings. It is therefore to be understood that changes may be made in the particular embodiments disclosed that are within the scope and spirit of the disclosure as defined by the appended claims and equivalents.

What is claimed is:

1. A signal processing system for generating an engine signature from indexed engine data, the system comprising:
a buffering unit configured to receive the indexed engine data;
an engine data repair unit operatively coupled to the buffering unit and configured to generate reconstructed engine data;
a synchronization unit operatively coupled to the engine data repair unit and configured to produce an engine cycles signal; and
a filter operatively coupled to the synchronization unit and configured to filter the engine cycles signal to produce the engine signature.

2. The signal processing system of claim 1, further comprising:
a tag collection unit configured to receive a data tag and to provide an external trigger tag to the synchronization unit and an error tag to the engine data repair unit.

3. The signal processing system of claim 1, wherein the filter comprises at least one of a signature filter and an integrator.

4. The signal processing system of claim 2, wherein the engine data repair unit is further configured to perform an interpolation routine using the error tag to connect a last good data point with a next good data point.

5. The signal processing system of claim 1, further comprising:
an engine cycle parameter calculator configured to receive the engine cycles signal and to compute an RPM value from the engine cycles signal.

6. The signal processing system of claim 1, wherein the synchronization unit further comprises:
a spectrum analyzer configured to determine a cylinder firing frequency from the indexed engine data;
a bandpass filter operatively coupled to the spectrum analyzer and configured to generate a timing signal from filtering the indexed engine data by the cylinder firing frequency;
a frequency to period conversion module configured to convert the cylinder firing frequency to a periodic signal; and
a resampler configured to produce the engine signature by resampling the indexed engine data using the periodic signal and the timing signal.

7. The signal processing system of claim 6, further comprising:
a mean value removal module configured to remove a mean value signal component from the indexed engine data to produce a time domain alternating current signal.

8. The signal processing system of claim 7, further comprising:
a Fourier transform module operatively coupled to the mean value removal module and configured to convert the time domain alternating current signal into a frequency domain alternating current signal; and
an inverse Fourier transform module configured to convert the frequency domain alternating current signal into a time domain signal for a phase calculation.

9. The signal processing system of claim 6, wherein the bandpass filter is synthesized based on the cylinder firing frequency.

10. The signal processing system of claim 6, further comprising:
a phase calculator configured to calculate phase information for the indexed engine data; and
a phase differentiator configured to receive the calculated phase and to compute the frequency for input to the frequency to period conversion module.

11. The signal processing system of claim 6, further comprising:
a resample rate controller operatively coupled to the resampler and configured to adjust the resampling rate responsive to closed loop servo routine.

12. The signal processing system of claim 11, wherein the resample rate controller is further configured to compare a signature phase with a reference phase and to generate a phase control bias signal.

13. The signal processing system of claim 6, wherein the resampler is further configured to synchronize the generation of the engine signature to a predetermined angular phase.

14. The signal processing system of claim 13, wherein the predetermined angular phase comprises 0 degrees.

15. The signal processing system of claim 13, further comprising a display module configured to display, on a display screen, the engine signature beginning at the predetermined angular phase.

16. The signal processing system of claim 6, wherein the frequency to period conversion module is further configured to receive as input a number of engine cylinders and to use the number of engine cylinders in converting the cylinder firing frequency to a periodic signal.

17. The signal processing system of claim 6, further comprising:
a buffer configured to buffer the resampler output of the indexed engine data and control the buffered output such that the engine signature includes a predetermined number of data points.

18. The signal processing system of claim 17, wherein the predetermined number of data points comprises 500 data points.

19. The signal processing system of claim 17, further comprising a display module configured to display, on a display screen, the predetermined number of data points of the engine signature.

20. The signal processing system of claim 17, further comprising:
an application programming interface configured to the engine signature from the buffer and to interface the engine signature with a computing device.

21. A method for generating an engine signature from indexed engine data, the method comprising:
receiving the indexed engine data;
generating reconstructed engine data;
producing an engine cycles signal; and
filtering the engine cycles signal to produce the engine signature.

22. The method of claim 21, further comprising:
receiving a data tag in a tag collection unit; and
providing an external trigger tag to a synchronization unit and an error tag to an engine data repair unit.

23. The method of claim 21, wherein filtering the engine cycles signal to produce the engine signature comprises implementing at least one of a signature filter and an integrator.

24. The method of claim 22, further comprising:
performing an interpolation routine using the error tag to connect a last good data point with a next good data point.

25. The method of claim 21, further comprising:
computing an RPM value from the engine cycles signal.

26. The method of claim 21, further comprising:
determining a cylinder firing frequency from the indexed engine data;
generating a timing signal from filtering the indexed engine data by the cylinder firing frequency;
converting the cylinder firing frequency to a periodic signal; and
resampling the indexed engine data using the periodic signal and the timing signal to produce the engine signature.

27. The method of claim 26, further comprising:
calculating phase information for the indexed engine data; and computing the frequency for the step of converting of the cylinder firing frequency to the periodic signal.

28. The method of claim 26, further comprising:
adjusting the resampling rate responsive to a closed loop servo routine.

29. The method of claim 26, wherein resampling the indexed engine data using the periodic signal and the timing signal to produce the engine signature further comprises:
synchronizing generation of the engine signature to a predetermined angular phase.

30. The method of claim 29, wherein the predetermined angular phase comprises 0 degrees.

31. The method of claim 29, further comprising:
displaying the engine signature beginning at the predetermined angular phase.

32. The method of claim 26, further comprising:
buffering the resampled indexed engine data and controlling the buffered output such that the engine signature includes a predetermined number of data points.

33. A signal processing system for generating an engine signature from indexed engine data, the system comprising:
means for receiving the indexed engine data;
means for generating reconstructed engine data;
means for producing an engine cycles signal; and
means for filtering the engine cycles signal to produce the engine signature.

\* \* \* \* \*